United States Patent
Sudo et al.

(10) Patent No.: US 10,351,772 B2
(45) Date of Patent: *Jul. 16, 2019

(54) NEMATIC LIQUID CRYSTAL COMPOSITION AND LIQUID CRYSTAL DISPLAY ELEMENT USING SAME

(71) Applicant: DIC CORPORATION (TOKYO), Tokyo (JP)

(72) Inventors: Go Sudo, Kita-adachi-gun (JP); Marina Goto, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 15/308,215

(22) PCT Filed: Apr. 9, 2015

(86) PCT No.: PCT/JP2015/061081
§ 371 (c)(1),
(2) Date: Nov. 1, 2016

(87) PCT Pub. No.: WO2015/174175
PCT Pub. Date: Nov. 19, 2015

(65) Prior Publication Data
US 2017/0051203 A1    Feb. 23, 2017

(30) Foreign Application Priority Data

May 13, 2014 (JP) .................. 2014-099492

(51) Int. Cl.

| | |
|---|---|
| *G02F 1/1333* | (2006.01) |
| *C09K 19/12* | (2006.01) |
| *C08F 20/26* | (2006.01) |
| *C09K 19/14* | (2006.01) |
| *C09K 19/16* | (2006.01) |
| *C09K 19/20* | (2006.01) |
| *C09K 19/30* | (2006.01) |
| *C09K 19/38* | (2006.01) |
| *C09K 19/42* | (2006.01) |
| *C09K 19/54* | (2006.01) |
| *G02F 1/13* | (2006.01) |
| *C09K 19/04* | (2006.01) |

(52) U.S. Cl.
CPC .............. *C09K 19/12* (2013.01); *C08F 20/26* (2013.01); *C09K 19/14* (2013.01); *C09K 19/16* (2013.01); *C09K 19/20* (2013.01); *C09K 19/2007* (2013.01); *C09K 19/30* (2013.01); *C09K 19/38* (2013.01); *C09K 19/42* (2013.01); *C09K 19/54* (2013.01); *G02F 1/13* (2013.01); *G02F 1/133365* (2013.01); *C09K 2019/0448* (2013.01); *C09K 2019/122* (2013.01); *G02F 2001/133397* (2013.01)

(58) Field of Classification Search
CPC ........ C09K 19/12; C09K 19/14; C09K 19/16; C09K 19/20; C09K 19/2007; C09K 19/30; C09K 19/38; C09K 19/42; C09K 19/54; C09K 2019/0448; C09K 2019/122; G02F 1/13; G02F 1/1333; G02F 1/133365; G02F 2001/133397; C08F 20/26

USPC ..................................................... 252/299.63
See application file for complete search history.

(56) References Cited

U.S. PATENT DOCUMENTS

| | | |
|---|---|---|
| 5,384,065 A | 1/1995 | Geelhaar et al. |
| 5,599,480 A | 2/1997 | Tarumi et al. |
| 5,653,911 A | 8/1997 | Kondo et al. |
| 5,720,899 A | 2/1998 | Kondo et al. |
| 6,066,268 A | 5/2000 | Ichinose et al. |
| 8,092,871 B2 | 1/2012 | Usui et al. |
| 8,603,358 B2 | 12/2013 | Kuriyama et al. |
| 9,005,477 B2 | 4/2015 | Kuriyama et al. |
| 9,045,684 B2 | 6/2015 | Gotoh et al. |
| 9,725,651 B2 | 8/2017 | Hirata et al. |

(Continued)

FOREIGN PATENT DOCUMENTS

| | | |
|---|---|---|
| CN | 102876338 A | 1/2013 |
| EP | 0 474 062 A2 | 3/1992 |

(Continued)

OTHER PUBLICATIONS

International Search Report dated Jul. 14, 2015, issued in counterpart International Application No. PCT/JP2015/061081 (2 pages).

(Continued)

*Primary Examiner* — Geraldina Visconti
(74) *Attorney, Agent, or Firm* — Westerman, Hattori, Daniels & Adrian, LLP

(57) ABSTRACT

The present invention relates to a nematic liquid crystal composition containing a polymerizable compound and having a negative dielectric anisotropy (Δε) and PSA or PSVA liquid crystal display element produced by using the same. The liquid crystal composition according to the present invention can provide PSA or PSVA liquid crystal display element, in which a sufficient pretilt angle is included, the amount of remaining monomer is small, there are no or almost no problems, e.g., alignment defects and display defects, arisen from a low voltage holding rate (VHR) and the like, and excellent response performance is exhibited. A liquid crystal display element using the liquid crystal composition according to the present invention is useful for an active-matrix-drive liquid crystal display element and can be applied to PSA, PSVA, and other liquid crystal display elements.

9 Claims, No Drawings

(56) References Cited

U.S. PATENT DOCUMENTS

| | | | |
|---|---|---|---|
| 10,113,115 B2* | 10/2018 | Maruyama | C09K 19/3402 |
| 2002/0014613 A1 | 2/2002 | Klasen et al. | |
| 2003/0222245 A1 | 12/2003 | Klasen-Memmer et al. | |
| 2004/0099842 A1 | 5/2004 | Klasen-Memmer et al. | |
| 2004/0146662 A1 | 7/2004 | Klasen-Memmer et al. | |
| 2005/0224758 A1 | 10/2005 | Yamamoto et al. | |
| 2006/0238696 A1 | 10/2006 | Wen et al. | |
| 2008/0149891 A1 | 6/2008 | Klasen-Memmer et al. | |
| 2008/0191167 A1 | 8/2008 | Klasen-Memmer et al. | |
| 2009/0103011 A1 | 4/2009 | Bernatz et al. | |
| 2010/0025631 A1 | 2/2010 | Son et al. | |
| 2010/0051864 A1 | 3/2010 | Klasen-Memmer et al. | |
| 2010/0149446 A1 | 6/2010 | Fujisawa et al. | |
| 2011/0043747 A1 | 2/2011 | Kawasaki et al. | |
| 2011/0149226 A1 | 6/2011 | Saito et al. | |
| 2011/0155953 A1 | 6/2011 | Hattori et al. | |
| 2011/0175027 A1 | 7/2011 | Hattori et al. | |
| 2012/0092608 A1 | 4/2012 | Ito et al. | |
| 2012/0097895 A1 | 4/2012 | Kuriyama et al. | |
| 2012/0161072 A1 | 6/2012 | Saito et al. | |
| 2012/0162595 A1 | 6/2012 | Lee et al. | |
| 2012/0181478 A1 | 7/2012 | Hattori et al. | |
| 2012/0229744 A1 | 9/2012 | Hattori et al. | |
| 2012/0261614 A1 | 10/2012 | Goto et al. | |
| 2012/0292567 A1 | 11/2012 | Kuriyama et al. | |
| 2012/0292568 A1 | 11/2012 | Kuriyama et al. | |
| 2012/0305843 A1 | 12/2012 | Klasen-memmer et al. | |
| 2013/0038956 A1 | 2/2013 | Matsumoto et al. | |
| 2013/0069002 A1 | 3/2013 | Yanai et al. | |
| 2013/0114010 A1 | 5/2013 | Goetz et al. | |
| 2013/0265527 A1 | 10/2013 | Takeuchi et al. | |
| 2013/0277609 A1 | 10/2013 | Goto et al. | |
| 2014/0010973 A1 | 1/2014 | Gotoh et al. | |
| 2014/0027671 A1 | 1/2014 | Gotoh et al. | |
| 2014/0028964 A1 | 1/2014 | Klasen-Memmer et al. | |
| 2014/0043579 A1 | 2/2014 | Furusato et al. | |
| 2014/0085591 A1 | 3/2014 | Feng et al. | |
| 2014/0097383 A1 | 4/2014 | Furusato et al. | |
| 2014/0183409 A1 | 7/2014 | Gotoh et al. | |
| 2015/0123032 A1 | 5/2015 | Sudo et al. | |
| 2015/0218450 A1 | 8/2015 | Sudo et al. | |
| 2015/0299570 A1 | 10/2015 | Kurisawa et al. | |
| 2016/0009999 A1* | 1/2016 | Hirata | C09K 19/54 |
| | | | 252/299.63 |
| 2016/0122650 A1 | 5/2016 | Hirata et al. | |
| 2016/0274418 A1 | 9/2016 | Schadt et al. | |
| 2016/0289565 A1* | 10/2016 | Sudo | C07C 25/22 |
| 2016/0319191 A1* | 11/2016 | Hirata | C09K 19/44 |

FOREIGN PATENT DOCUMENTS

| | | |
|---|---|---|
| EP | 2522649 A1 | 11/2012 |
| JP | H01-240591 A | 9/1989 |
| JP | H01-247482 A | 10/1989 |
| JP | H02-22382 A | 1/1990 |
| JP | H08-12605 A | 1/1996 |
| JP | 08-104869 A | 4/1996 |
| JP | H11-140447 A | 5/1999 |
| JP | 2001-354967 A | 12/2001 |
| JP | 2002-145830 A | 5/2002 |
| JP | 2003-307720 A | 10/2003 |
| JP | 2003-327965 A | 11/2003 |
| JP | 2004-532344 A | 10/2004 |
| JP | 2005-272562 A | 10/2005 |
| JP | 2005-320511 A | 11/2005 |
| JP | 2006-037054 A | 2/2006 |
| JP | 2006-301643 A | 11/2006 |
| JP | 2007002132 A | 1/2007 |
| JP | 2008-116931 A | 5/2008 |
| JP | 2008-143902 A | 6/2008 |
| JP | 2008-144135 A | 6/2008 |
| JP | 2008-208365 A | 9/2008 |
| JP | 2009-504814 A | 2/2009 |
| JP | 2009-057562 A | 3/2009 |
| JP | 2009-270085 A | 11/2009 |
| JP | 2011-042696 A | 3/2011 |
| JP | 2011-144274 A | 7/2011 |
| JP | 2011213787 A | 10/2011 |
| JP | 2012-018215 A | 1/2012 |
| JP | 2012-077200 A | 4/2012 |
| JP | 2012-87165 A | 5/2012 |
| JP | 2012-097222 A | 5/2012 |
| JP | 2012-97222 A | 5/2012 |
| JP | 2012-136623 A | 7/2012 |
| JP | 2012-240945 A | 12/2012 |
| JP | 2012-241124 A | 12/2012 |
| JP | 2013-503952 A | 2/2013 |
| JP | 2013-76061 A | 4/2013 |
| JP | 2013-180974 A | 9/2013 |
| JP | 5333685 B2 | 11/2013 |
| JP | 2014-43561 A | 3/2014 |
| JP | 2014-141648 A | 8/2014 |
| JP | 2015-157915 A | 9/2015 |
| JP | WO2013-161576 A | 12/2015 |
| JP | WO2014-24648 A1 | 7/2016 |
| WO | 2007/077872 A1 | 7/2007 |
| WO | 2010/029843 A1 | 3/2010 |
| WO | 2010/084823 A1 | 7/2010 |
| WO | 2010/119779 A1 | 10/2010 |
| WO | 2010/131600 A1 | 11/2010 |
| WO | 2011/055643 A1 | 5/2011 |
| WO | 2011/074384 A1 | 6/2011 |
| WO | 2012/022391 A2 | 2/2012 |
| WO | 2012/043386 A1 | 4/2012 |
| WO | 2012/086504 A1 | 6/2012 |
| WO | 2012/130380 A1 | 10/2012 |
| WO | 2012/137810 A1 | 10/2012 |
| WO | 2013/022088 A1 | 2/2013 |
| WO | 2013/125379 A1 | 8/2013 |
| WO | 2013/161576 A1 | 10/2013 |
| WO | 2014/007118 A1 | 1/2014 |

OTHER PUBLICATIONS

International Search Report dated May 27, 2014, issued in counterpart Application No. PCT/JP2014/055460.

Non-Final Office Action dated Apr. 5, 2016, issued in U.S. Appl. No. 14/771,954.

Non-Final Office Action dated Nov. 3, 2017, issued in U.S. Appl. No. 14/771,954.

Final Office Action dated Nov. 4, 2016, issued in U.S. Appl. No. 14/771,954.

Final Office Action dated May 29, 2018, issued in U.S. Appl. No. 14/771,954.

* cited by examiner

NEMATIC LIQUID CRYSTAL COMPOSITION AND LIQUID CRYSTAL DISPLAY ELEMENT USING SAME

TECHNICAL FIELD

The present invention relates to a liquid crystal composition containing a polymerizable compound and a liquid crystal display element using the same.

BACKGROUND ART

PSA (polymer sustained alignment) liquid crystal display devices have a structure in which a polymer structure is disposed in a cell so as to control the pretilt angle of liquid crystal molecules and have been developed as liquid crystal display elements because of rapid response and high contrast.

The PSA liquid crystal display element is produced by injecting a polymerizable composition, which is composed of a liquid crystal compound and a polymerizable compound, between substrates and polymerizing the polymerizable compound while a voltage is applied and liquid crystal molecules are aligned so as to immobilize the alignment of the liquid crystal molecules. Known causes of image-sticking, which is a display defect of PSA liquid crystal display element, are impurities and a change in alignment of liquid crystal molecules (change in pretilt angle).

The image-sticking due to impurities occurs because of remaining polymerizable compounds resulting from incomplete polymerization and a polymerization initiator added for the purpose of facilitating the polymerization. Therefore, it is necessary that the amount of remaining polymerizable compound after the polymerization be minimized and the amount of addition of the polymerization initiator be reduced. For example, if a large amount of polymerization initiator is added such that the polymerization proceeds completely, the voltage holding rate of a display element is reduced because of remaining polymerization initiator, and the display quality is adversely affected. Also, if the amount of polymerization initiator used at the time of polymerization is reduced in order to suppress reduction in the voltage holding rate, the polymerizable compound remains because the polymerization does not completely proceed, and an occurrence of image-sticking due to the remaining polymerizable compound is unavoidable. Meanwhile, in order to completely cure the polymerizable compound in a small amount of addition of the polymerization initiator and to reduce the amount of remaining polymerizable compound, there is a method in which a large amount of energy is applied by intense ultraviolet irradiation for a long lime during polymerization. However, in this case, upsizing of a production apparatus and reduction in the production efficiency are caused and, in addition, degradation of a liquid crystal material due to ultraviolet rays and the like occur. Therefore, regarding the liquid crystal composition containing a polymerizable compound in the related art, it is difficult to reduce the amount of remaining of both uncured polymerizable compound and polymerization initiator at the same time.

Also, an occurrence of image-sticking resulting from a change in the pretilt angle of liquid crystal molecules is known. That is, the cause of image-sticking is a change in the pretilt angle when the display element continues to display the same pattern for a long time because of differences in cured materials of the polymerizable compound. In this case, a polymerizable compound that forms an appropriate polymer is required.

In order to prevent image-sticking, construction of a display element by using a polymerizable compound having a structure of 1,4-phenylene group or the like as a ring structure (refer to PTL 1) and construction of a display element by using a polymerizable compound having a biaryl structure (refer to PTL 2) have been disclosed. However, these polymerizable compounds have low compatibility with liquid crystal compounds and precipitation of the polymerizable compounds occurs when liquid crystal compositions are prepared. Therefore, it is difficult to apply these polymerizable compounds to practical liquid crystal compositions.

Also, in order to prevent image-sticking by improving the rigidity of a polymer, construction of a display element by using a mixed liquid crystal composition of a bifunctional polymerizable compound and trifunctional or higher polymerizable compound, e.g., dipentaerythritol pentaacrylate or dipentaerythritol hexaacrylate, (refer to PTL 3) has been proposed. However, dipentaerythritol pentaacrylate and dipentaerythritol hexaacrylate have no ring structure in the molecule and, therefore, there is a problem that sufficient alignment stability is not obtained because the affinity for liquid crystal compounds is weak and a force for regulating alignment is weak. Meanwhile, these polymerizable compounds require addition of polymerization initiators at the time of polymerization, and if the polymerization initiator is not added, the polymerizable compounds remain after the polymerization.

Consequently, it is difficult to sufficiently provide the characteristics, e.g., image-sticking characteristics of the display element, the alignment stability, the stability of the composition in which precipitation does not occur, and the production efficiency when PSA liquid crystal display element is produced, required of the liquid crystal composition containing a polymerizable compound. Therefore, further improvement is necessary.

As described above, attempts have been made to solve the display defect problem associated with the alignment of the liquid crystal molecules in the PSA display element having useful display performance (contrast and response speed) by using the polymerizable compound. Meanwhile, some components of the liquid crystal composition constituting the PSA display element are not suitable for use in the PSA display element. In particular, a liquid crystal composition containing a liquid crystal compound having an alkenyl group side chain useful for reducing viscosity so as to improve the response performance has been disclosed and is useful for reducing response speed of the VA display element (refer to PTL 4). However, there is a new problem related to alignment control, that is, after polymerization of the polymerizable compound, which is a production process of the PSA display element, provision of a pretilt angle to the liquid crystal molecules is hindered. In the case where an appropriate pretilt angle is not provided to the liquid crystal molecules, the movement direction of the liquid crystal molecules at the time of driving cannot be regulated and problems occur, for example, liquid crystal molecules do not fall in the predetermined direction so as to degrade the contrast, and the response speed is decreased.

As described above, it is necessary to ensure the performance, e.g., high contrast, rapid response, and high voltage holding rate, required of VA and other vertically aligned display elements and, in addition, items, e.g., generation of an appropriate pretilt angle and stability over time of the pretilt angle, required of PSA display element at the same time.

CITATION LIST

Patent Literature

PTL 1: Japanese Unexamined Patent Application Publication No. 2003-307720
PTL 2: Japanese Unexamined Patent Application Publication No. 2008-116931
PTL 3: Japanese Unexamined Patent Application Publication No. 2004-302096
PTL 4: Japanese Unexamined Patent Application Publication (Translation of PCT Application) No. 2009-504814

SUMMARY OF INVENTION

Technical Problem

It is known that use of liquid crystal compound having an alkenyl group side chain is effective in obtaining a low-viscosity liquid crystal composition exhibiting rapid response. However, if a polymerizable compound is added to such a liquid crystal composition and the PSA or VA liquid crystal display element is produced, problems, e.g., alignment defects and display defects, arisen from an insufficient tilt angle, a large amount of remaining monomer, a low voltage holding rate (VHR), and the like occur. In addition, the pretilt angle and remaining monomer cannot be controlled, optimization and reduction of the production energy cost are difficult, the production efficiency is degraded, and stable mass production is not achieved.

The problem to be solved by the present invention is to provide a liquid crystal composition containing a polymerizable compound for producing a PSA or PSVA liquid crystal display element, in which excellent response performance is exhibited, a sufficient pretilt angle is included, the amount of remaining monomer is small, and there are no or almost no problems, e.g., alignment defects and display defects, arisen from a low voltage holding rate (VHR) and the like and to provide a liquid crystal display element using the same.

Solution to Problem

The present inventors performed intensive investigations and, as a result, found that the above-described problems were able to be solved by using a liquid crystal composition containing a polymerizable compound, which was composed of a polymerizable compound having a specific chemical structure and a liquid crystal compound. Consequently, the present invention was completed.

The present invention provides a liquid crystal composition containing a polymerizable compound containing at least one polymerizable compound represented by general formula (I-1)

[Chem. 1]

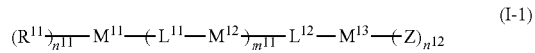

(I-1)

(in the formula, Z represents a hydrogen atom, an alkyl group having 1 to 12 carbon atoms, an alkoxyl group having 1 to 12 carbon atoms, or $R^{12}$, $R^{11}$ represents $P^{11}$—$S^{11}$—, $R^{12}$ represents $P^{12}$—$S^{12}$—, each of $P^{11}$ and $P^{12}$ independently represents any one of formula (R-1) to formula (R-15),

[Chem. 2]

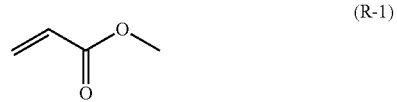
(R-1)

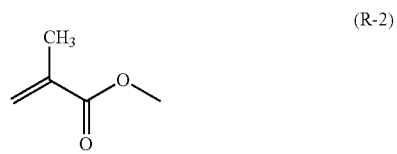
(R-2)

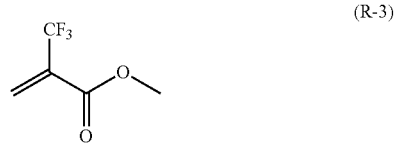
(R-3)

(R-4)

(R-5)

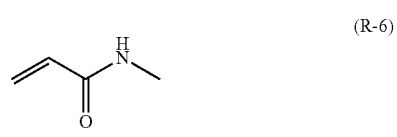
(R-6)

(R-7)

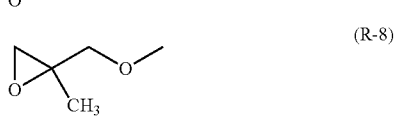
(R-8)

(R-9)

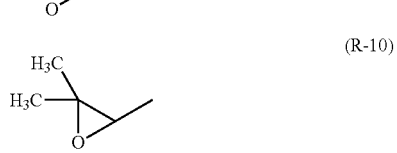
(R-10)

(R-11)

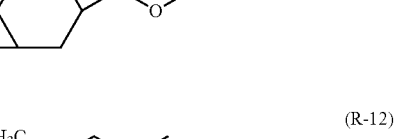
(R-12)

(R-13)

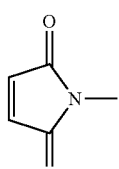
(R14)

HS— (R-15)

each of $S^{11}$ and $S^{12}$ independently represents a single bond or an alkylene group having 1 to 15 carbon atoms, at least one —$CH_2$— in the alkylene group may be substituted with —O—, —OCO—, or —COO— such that oxygen atoms do not directly adjoin, at least one of included $S^{11}$ and $S^{12}$ is a single bond, each of $M^{11}$, $M^{12}$, and $M^{13}$ independently represents a 1,4-phenylene group, a benzene-1,2,4-triyl group, a benzene-1,2,4,6-tetrayl group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, in which the group may be unsubstituted or may be substituted with an alkyl group having 1 to 12 carbon atoms, an alkoxyl group having 1 to 12 carbon atoms, a halogen, a cyano group, or a nitro group, at least one of $L^{11}$ and $L^{12}$ represents —O—, —S—, —$CH_2$—, —$OCH_2$—, —$CH_2O$—, —CO—, —$C_2H_4$—, —COO—, —OCO—, —$OCOOCH_2$—, —$CH_2OCOO$—, —$OCH_2CH_2O$—, —CO—$NR^a$—, —$NR^a$—CO—, —$SCH_2$—, —$CH_2S$—, —CH=$CR^a$—COO—, —CH=$CR^a$—OCO—, —COO—$CR^a$—CH—, —OCO—$CR^a$=CH, —COO—$CR^a$=CH—COO—, —COO—$CR^a$=CH—OCO—, —OCO—$CR^a$=CH—COO—, —OCO—$CR^a$=CH—OCO—, —$(CH_2)_z$—C(=O)—O—, —$(CH_2)_z$—O—(C=O)—, —O—(C=O)—$(CH_2)_z$—, —(C=O)—O—$(CH_2)_z$—, —CH=CH—, —CF=CF—, —CF=CH—, —CH=CF—, —$CF_2$—, —$CF_2O$—, —$OCF_2$—, —$CF_2CH_2$—, —$CH_2CF_2$—, —$CF_2CF_2$—, or —C≡C— (in the formulae, each $R^a$ independently represents a hydrogen atom or an alkyl group having 1 to 4 carbon atoms, and in the formulae, z represents an integer of 1 to 4), each of the other $L^{11}$ and $L^{12}$ represents a single bond, each of $n^{11}$ and $n^{12}$ independently represents an integer of 0 to 3, a total number of $R^{11}$ and $R^{12}$ is 3 or more, $m^{11}$ represents 2 or 3, and a plurality of $L^{11}$ and $M^{12}$ may be the same or may be different from each other) as a first component and at least one of liquid crystal compound having an alkenyl side chain group as a second component, and provides a liquid crystal display element using the same.

Advantageous Effects of Invention

The liquid crystal composition containing a polymerizable compound according to the present invention is a liquid crystal composition, in which refractive index anisotropy (Δn) and a nematic phase-isotropic liquid phase transition temperature ($T_{ni}$) are not reduced, a solid phase-nematic phase transition temperature ($T_{cn}$) is not raised, viscosity (η) is sufficiently minimized, rotational viscosity (γ1) is sufficiently minimized, and elastic modulus ($K_{33}$) is large. Regarding the liquid crystal display element using the liquid crystal composition, a sufficient pretilt angle is obtained, the amount of remaining monomer is small, a voltage holding rate (VHR) is high, and rapid response is exhibited. Therefore, regarding the resulting liquid crystal display element, problems such as alignment defects and display defects, e.g., image-sticking, do not occur or are reduced, excellent display quality is exhibited, and a response speed is high.

In addition, the liquid crystal composition containing a polymerizable compound according to the present invention can control a pretilt angle and an amount of remaining monomer by adjusting the content of the polymerizable compound or combination of the polymerizable compounds and can easily improve the production efficiency by optimization and reduction of the production energy cost. Therefore, the liquid crystal display element according to the present invention is very useful.

DESCRIPTION OF EMBODIMENTS

A liquid crystal composition containing a polymerizable compound according to the present invention contains a polymerizable compound represented by general formula (I-1)

[Chem. 3]

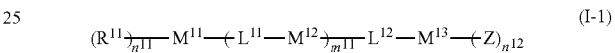

as a first component.

In the formula, Z represents a hydrogen atom, an alkyl group having 1 to 12 carbon atoms, an alkoxyl group having 1 to 12 carbon atoms, or $R^{12}$, and is preferably $R^{12}$.

$R^{11}$ represents $P^{11}$—$S^{11}$—, $R^{12}$ represents $P^{12}$—$S^{12}$—, and each of $P^{11}$ and $P^{12}$ independently represents any one of formula (R-1) to formula (R-15)

[Chem. 4]

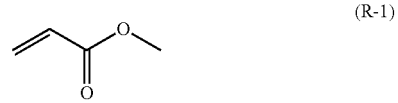
(R-1)

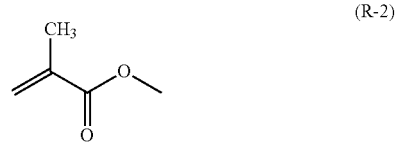
(R-2)

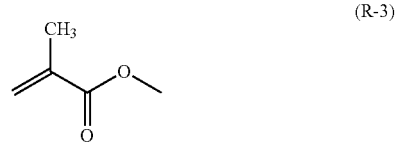
(R-3)

(R-4)

(R-5)

(R-6)

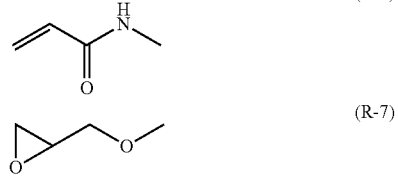
(R-7)

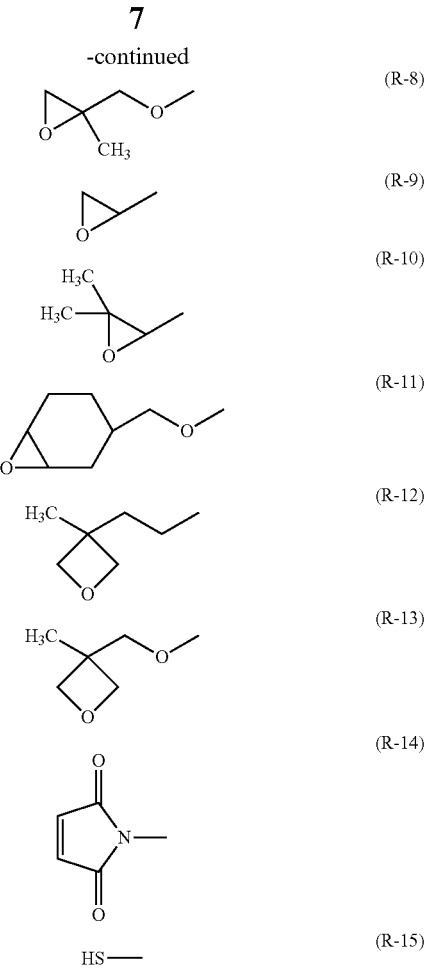

and is preferably formula (R-1) or formula (R-2).

A plurality of $R^{11}$ and $R^{12}$ may be the same or may be different from each other.

Each of $S^{11}$ and $S^{12}$ independently represents a single bond or an alkylene group having 1 to 15 carbon atoms, and at least one —$CH_2$— in the alkylene group may be substituted with —O—, —OCO—, or —COO— such that oxygen atoms do not directly adjoin. A single bond, an alkylene group having 1 to 6 carbon atoms, or an alkylene group having 1 to 6 carbon atoms, in which at least one —$CH_2$— in the alkylene group is substituted with —O— such that oxygen atoms do not directly adjoin, is preferable and a single bond is particularly preferable. Also, at least one of included $S^{11}$ and $S^{12}$ is a single bond, and preferably, all the included $S^{11}$ and $S^{12}$ are single bonds.

Each of $M^{11}$, $M^{12}$, and $M^{13}$ independently represents a 1,4-phenylene group, a benzene-1,2,4-triyl group, a benzene-1,2,4,6-tetrayl group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, in which the group may be unsubstituted or may be substituted with an alkyl group having 1 to 12 carbon atoms, an alkoxyl group having 1 to 12 carbon atoms, a halogen, a cyano group, or a nitro group, and a 1,4-phenylene group, a benzene-1,2,4-triyl group, a benzene-1,2,4,6-tetrayl group, a naphthalene-2,6-diyl group, an indan-2,5-diyl group, and a 1,2,3,4-tetrahydronaphthalene-2,6-diyl group, which are unsubstituted or substituted with a methyl group or a fluorine group, are preferable. The ring structures of $M^{11}$, $M^{12}$, and $M^{13}$ present in general formula (I-1) may be completely unsubstituted. However, for the purpose of improving the compatibility of the liquid crystal composition, substitution with one or two fluorine groups or methyl groups in the entire ring structure is preferable and substitution with one fluorine group is more preferable.

At least one of $L^{11}$ and $L^{12}$ represents —O—, —S—, —$CH_2$—, —$OCH_2$—, —$CH_2O$—, —CO—, —$C_2H_4$—, —COO—, —OCO—, —$OCOOCH_2$—, —$CH_2OCOO$—, —$OCH_2CH_2O$—, —CO—$NR^a$—, —$NR^a$—CO—, —$SCH_2$—, —$CH_2S$—, —CH=$CR^a$—COO—, —CH=$CR^a$—OCO—, —COO—$CR^a$=CH—, —OCO—$CR^a$=CH—, —COO—$CR^a$=CH—COO—, —COO—$CR^a$=CH—OCO—, —OCO—$CR^a$=CH—COO—, —OCO—$CR^a$=CH—OCO—, —$(CH_2)_z$—C(=O)—O—, —$(CH_2)_z$—O—(C=O)—, —O—(C=O)—$(CH_2)_z$—, —(C=O)—O—$(CH_2)_z$—, —CH=CH—, —CF=CF—, —CF=CH—, —CH=CF—, —$CF_2$—, —$CF_2O$—, —$OCF_2$—, —$CF_2CH_2$—, —$CH_2CF_2$—, —$CF_2CF_2$—, or —C≡C— (in the formulae, each $R^a$ independently represents a hydrogen atom or an alkyl group having 1 to 4 carbon atoms, and in the formulae, z represents an integer of 1 to 4), and each of the other $L^{11}$ and $L^{12}$ represents a single bond. Each of $L^{11}$ and $L^{12}$ that is not a single bond but is a linking group is preferably —$OCH_2$—, —$CH_2O$—, —$C_2H_4$—, —COO—, —OCO—, —CH=$CR^a$—COO—, —CH=$CR^a$—OCO—, —COO—$CR^a$=CH—, —OCO—$CR^a$=CH—, —$(CH_2)_z$—COO—, —$(CH_2)_z$—OCO—, —OCO—$(CH_2)_z$—, —COO—$(CH_2)_z$—, —CH=CH—, —$CF_2O$—, —$OCF_2$—, or —C≡C— (in the formulae, each $R^a$ independently represents a hydrogen atom or an alkyl group having 1 to 3 carbon atoms, and in the formulae, z represents an integer of 1 to 4), more preferably —COO—, —OCO—, —CH=CH—COO—, —CH=CH—OCO—, —COO—CH=CH—, —OCO—CH=CH—, —$(CH_2)_2$—COO—, —$(CH_2)_2$—OCO—, —OCO—$(CH_2)_2$—, —COO—$(CH_2)_2$—, or —C≡C—, and further preferably —COO—, —OCO—, —CH=CH—COO—, —OCO—CH=CH—, —$(CH_2)_2$—COO—, —OCO—$(CH_2)_2$—, or —C≡C—.

Each of $n^{11}$ and $n^{12}$ independently represents an integer of 0 to 3, and a total number of $R^1$ and $R^{12}$ is 3 or 4. A total number of $R^{11}$ and $R^{12}$ is preferably 3.

A symbol $m^{11}$ represents 2 or 3, and is preferably 2.

That is, the polymerizable compound represented by general formula (I-1), which is the first component of the liquid crystal composition according to the present invention, has a mesogenic structure including four or five rings, a linking group is included in one place therein, and three or four polymerizable groups are included, as shown in the above-described structure.

Specific examples of polymerizable compounds represented by general formula (I-1) include compounds represented by general formulae (I-21) and (I-22) below.

[Chem. 5]

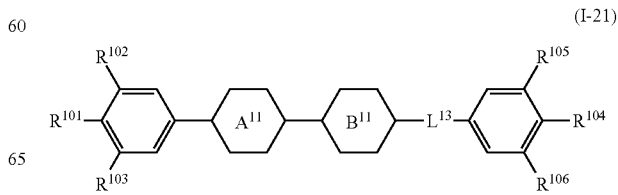

(I-21)

-continued (I-22)

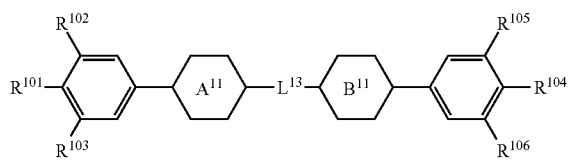

In the formulae, each of $R^{101}$ to $R^{106}$ independently represents a hydrogen atom, an alkyl group having 1 to 12 carbon atoms, an alkoxyl group having 1 to 12 carbon atoms, $P^{11}\!-\!S^{11}\!-\!$, or $P^{12}\!-\!S^{12}\!-\!$, three or four of $R^{101}$ to $R^{106}$ represent $P^{11}\!-\!S^{11}\!-\!$ or $P^{12}\!-\!S^{12}\!-\!$, each of $P^{11}$ and $P^{12}$ independently represents any one of formula (R-1) to formula (R-15), each of $S^{11}$ and $S^{12}$ independently represents a single bond or an alkylene group having 1 to 15 carbon atoms, and at least one —CH$_2$— in the alkylene group may be substituted with —O—, —OCO—, or —COO— such that oxygen atoms do not directly adjoin. Preferably, each of $R^{101}$ to $R^{106}$ represents a hydrogen atom, an alkyl group having 1 to 12 carbon atoms, an alkoxyl group having 1 to 12 carbon atoms, or any one of formula (R-1) to formula (R-5), and three or four of $R^{101}$ to $R^{106}$ represent any one of formula (R-1) to formula (R-5). Further preferably, each of $R^{101}$ to $R^{106}$ independently represents a hydrogen atom or any one of formula (R-1) to formula (R-3), and three of $R^{101}$ to $R^{106}$ represent any one of formula (R-1) to formula (R-3).

Each of $A^{11}$ and $B^{11}$ independently represents a 1,4-phenylene group, a 1,4-cyclohexylene group, a naphthalene-2,6-diyl group, or a 1,2,3,4-tetrahydronaphthalene-2,6-diyl group, in which the group may be unsubstituted or be substituted with an alkyl group having 1 to 3 carbon atoms, an alkoxyl group having 1 to 3 carbon atoms, or a halogen. A 1,4-phenylene group or a naphthalene-2,6-diyl group, in which the group is unsubstituted or substituted with an alkyl group having 1 to 3 carbon atoms or a fluorine group, is preferable, and a 1,4-phenylene group, which is unsubstituted or substituted with a fluorine group, is further preferable.

$L^{13}$ represents —OCH$_2$—, —CH$_2$O—, —C$_2$H$_4$—, —COO—, —OCO—, —CH=CR$^a$—COO—, —CH=CR$^a$—OCO—, —COO—CR$^a$=CH—, —OCO—CR$^a$=CH—, —(CH$_2$)$_z$—COO—, —(CH$_2$)$_z$—OCO—, —OCO—(CH$_2$)$_z$—, —COO—(CH$_2$)$_z$—, —CH=CH—, —CF$_2$O—, —OCF$_2$—, or —C≡C— (in the formulae, each $R^a$ independently represents a hydrogen atom or an alkyl group having 1 to 3 carbon atoms, and in the formulae, z represents an integer of 1 to 4). Each $L^{13}$ is preferably —OCH$_2$—, —CH$_2$O—, —C$_2$H$_4$—, —COO—, —OCO—, —CH=CH—COO—, —CH=CH—OCO—, —COO—CH=CH—, —OCO—CH=CH—, —(CH$_2$)$_2$—COO—, —(CH$_2$)$_2$—OCO—, —OCO—(CH$_2$)$_2$—, —COO—(CH$_2$)$_2$—, —CH=CH—, or —C≡C—, and further preferably —COO—, —OCO—, —CH=CH—COO—, —OCO—CH=CH—, —(CH$_2$)$_2$—COO—, —OCO—(CH$_2$)$_2$—, or —C≡C—.

Further, the compounds represented by general formula (I-21) are preferably, for example, polymerizable compounds represented by general formulae (I-21-01) to (I-21-28).

[Chem. 6]

(I-21-01)

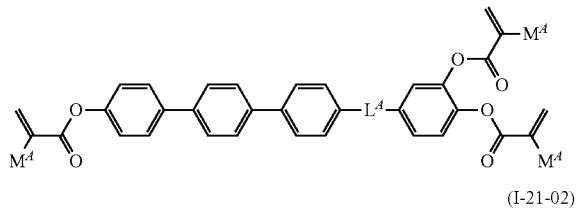

(I-21-02)

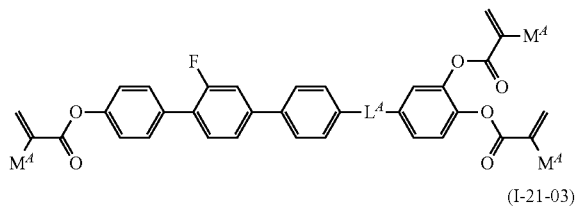

(I-21-03)

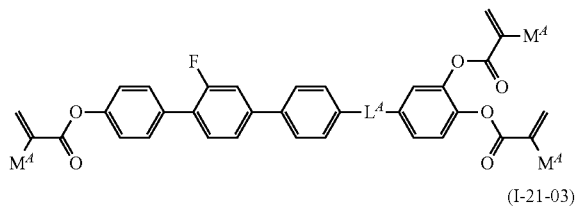

(I-21-04)

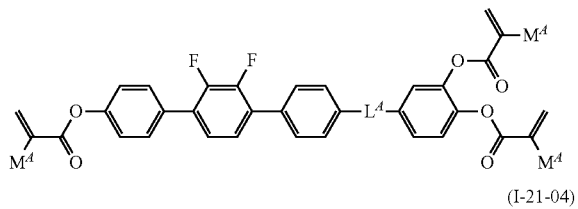

(I-21-05)

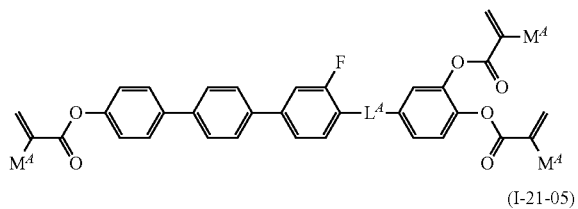

(I-21-06)

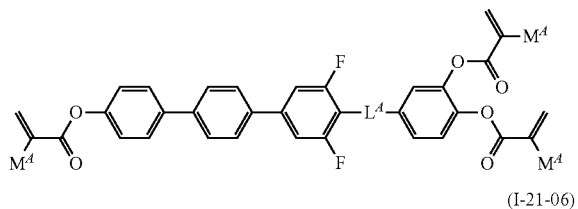

(I-21-07)

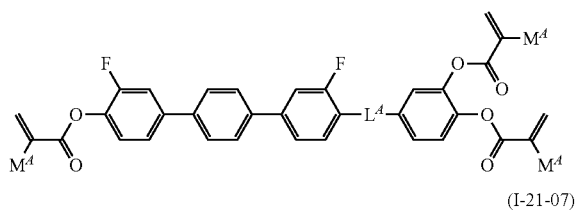

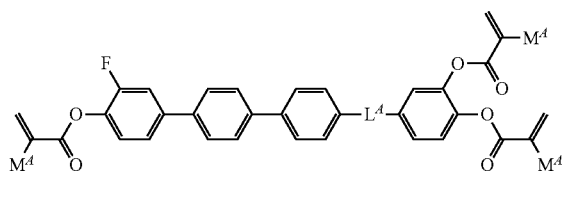

[Chem. 7]
(I-21-08)
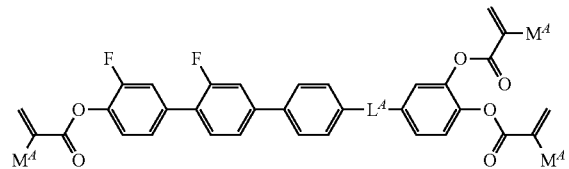
(I-21-09)
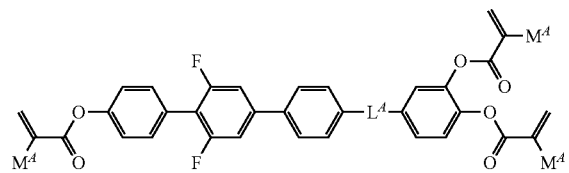
(I-21-10)
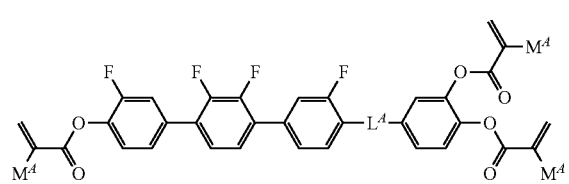
(I-21-11)
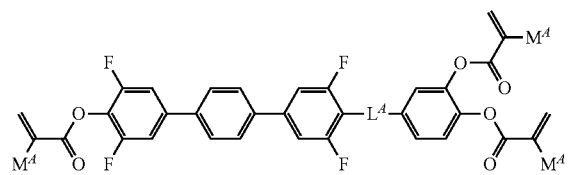
(I-21-12)
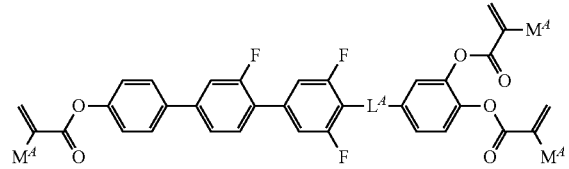
(I-21-13)
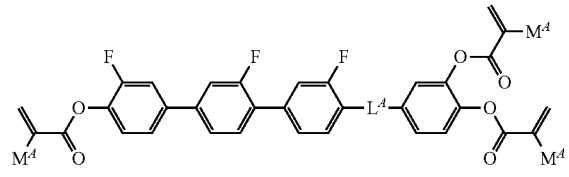
(I-21-14)
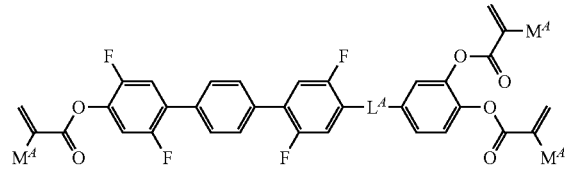
[Chem. 8]
(I-21-15)
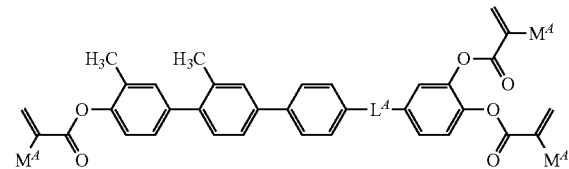
(I-21-16)
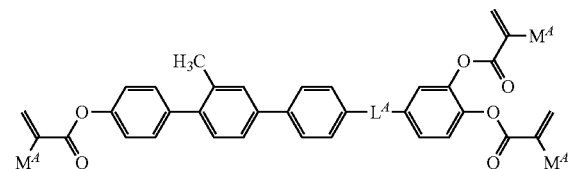
(I-21-17)
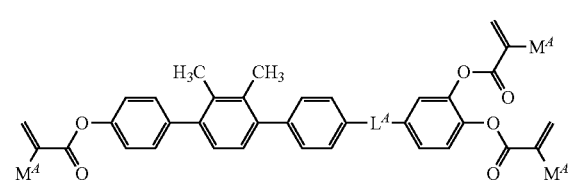
(I-21-18)
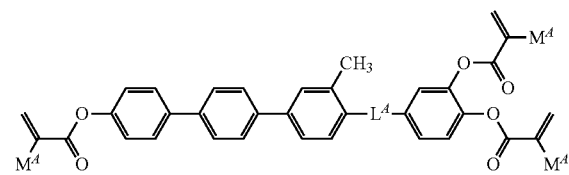
(I-21-19)
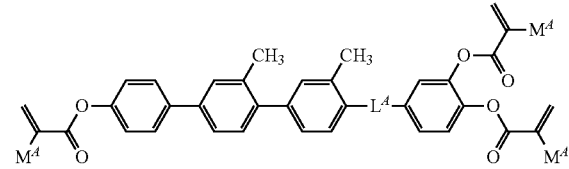
(I-21-20)
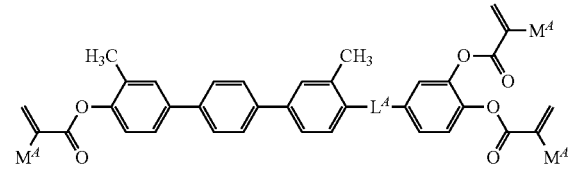
(I-21-21)
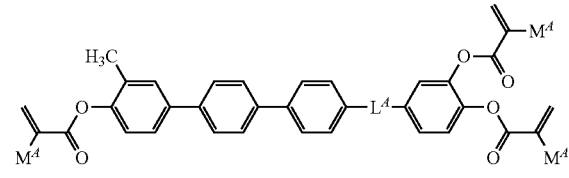

-continued

[Chem. 9]

(I-21-22)
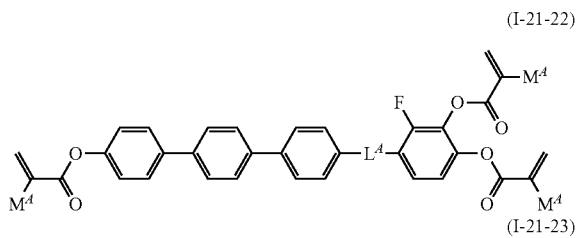

(I-21-23)
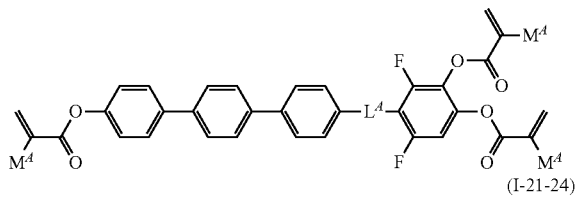

(I-21-24)
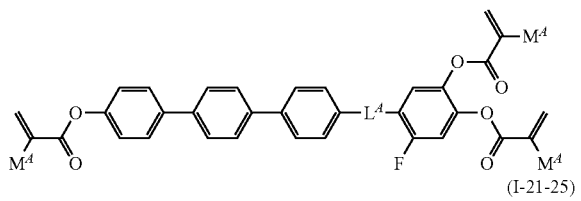

(I-21-25)
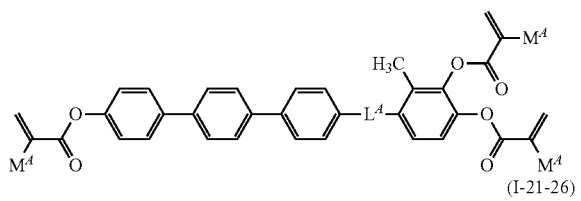

(I-21-26)
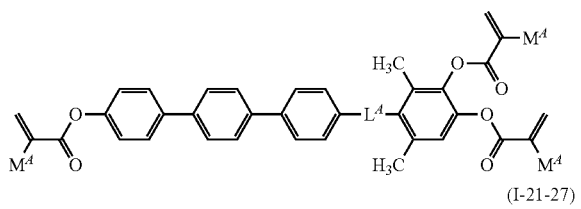

(I-21-27)
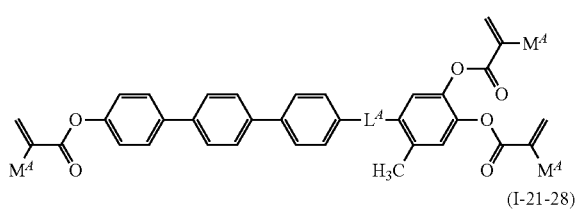

(I-21-28)
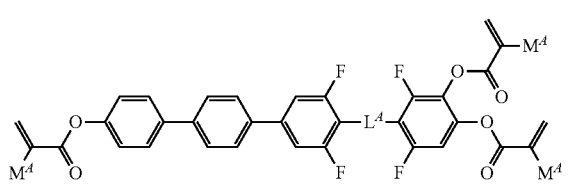

In the formulae, $M^A$ represents a hydrogen atom or a methyl group, and $L^A$ represents —COO—, —OCO—, —CH=CR$^a$—COO—, —CH—CR$^a$—OCO—, —COO—CR$^a$—CH—, —OCO—CR$^a$—CH—, —(CH$_2$)$_z$—COO—, —(CH$_2$)$_z$—OCO—, —O—CO—(CH$_2$)$_z$—, —COO—(CH$_2$)$_z$—, or —C≡C— (in the formulae, each R$^a$ independently represents a hydrogen atom or an alkyl group having 1 to 4 carbon atoms and z represents an integer of 1 to 4).

In this regard, z represents an integer of 1 to 4. However, 1 to 3 is preferable, 2 to 3 is preferable, and 2 is most preferable.

Further, the compounds represented by general formula (I-22) are preferably polymerizable compounds represented by general formulae (I-22-01) to (I-22-28), for example.

[Chem. 10]

(I-22-01)
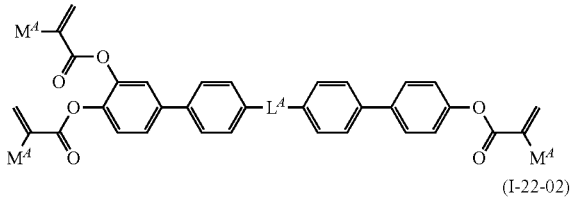

(I-22-02)
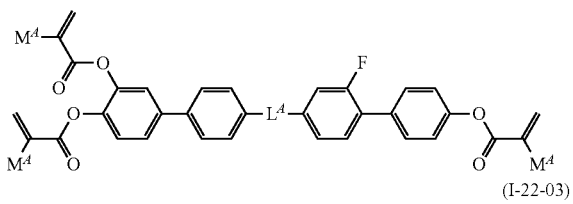

(I-22-03)
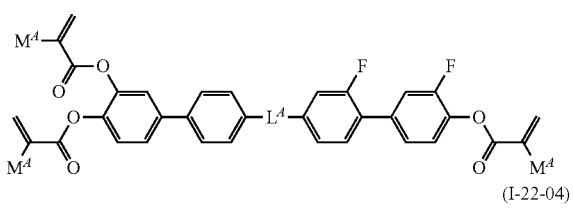

(I-22-04)
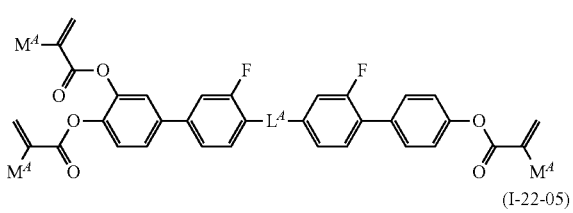

(I-22-05)
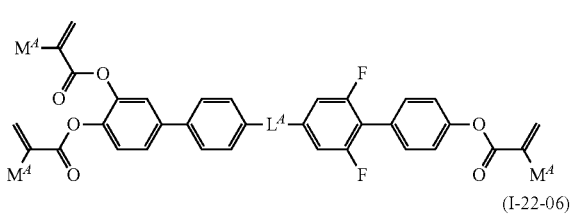

(I-22-06)
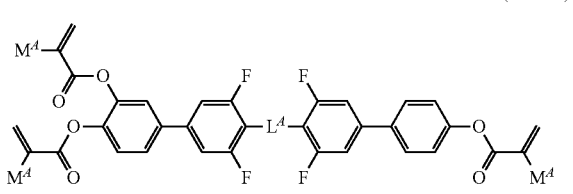

(I-22-07)
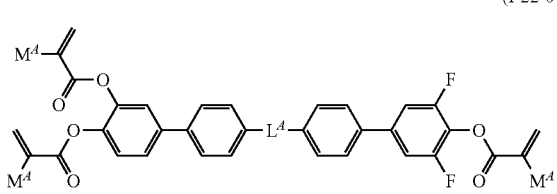

-continued

[Chem. 11]

(I-22-08)
(I-22-09)
(I-22-10)
(I-22-11)
(I-22-12)
(I-22-13)
(I-22-14)

-continued

[Chem. 12]

(I-22-15)
(I-22-16)
(I-22-17)
(I-22-18)
(I-22-19)
(I-22-20)
(I-22-21)

-continued

[Chem. 13]

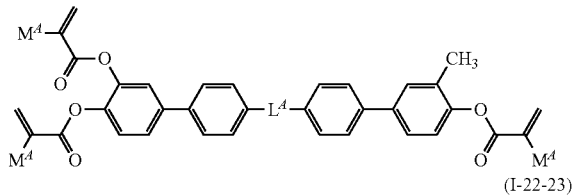
(I-22-22)

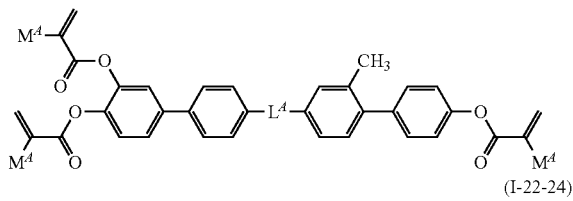
(I-22-23)

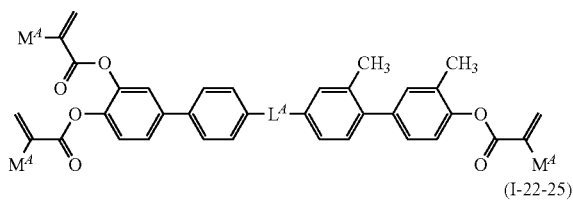
(I-22-24)

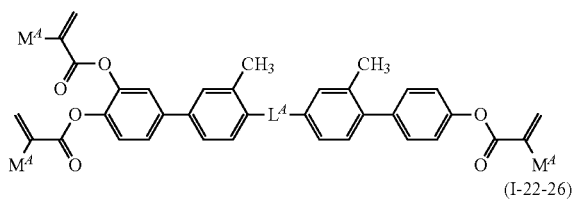
(I-22-25)

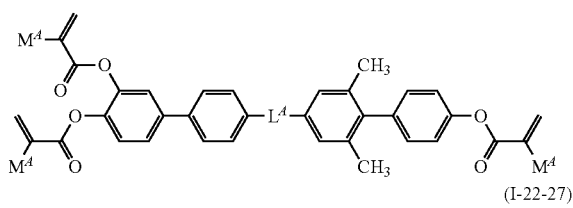
(I-22-26)

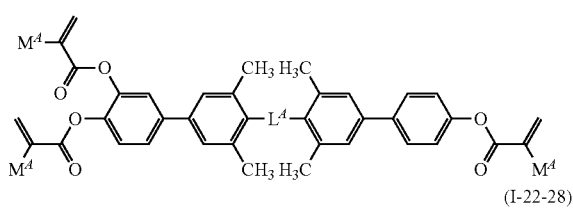
(I-22-27)

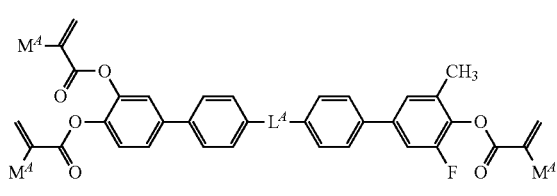
(I-22-28)

In the formulae, each of $M^A$ and $L^A$ represents the same as that described above.

The liquid crystal composition containing a polymerizable compound according to the present invention contains 0.01 to 5 percent by mass of polymerizable compound represented by general formula (I-1) as the first component, 0.01 to 1 percent by mass is preferable, 0.01 to 0.5 percent by mass is preferable, 0.01 to 0.4 percent by mass is preferable, 0.01 to 0.3 percent by mass is preferable, 0.02 to 0.3 percent by mass is preferable, and 0.05 to 0.2 percent by mass is preferable. For more details, in order to obtain a sufficient pretilt angle, a small amount of remaining monomer, or a high voltage holding rate (VHR), the content is preferably 0.05 to 0.3 percent by mass, and in the case where emphasis is placed on suppression of precipitation at low temperatures, the content is preferably 0.01 to 0.1 percent by mass. Also, in the case where a plurality of polymerizable compounds are contained, it is preferable that 0.02 to 0.2 percent by mass of polymerizable compounds represented by general formula (I-1) be contained.

The liquid crystal composition containing a polymerizable compound according to the present invention contains a liquid crystal compound having an alkenyl side chain group as the second component.

The liquid crystal compound having an alkenyl side chain group refers to a compound having an unsaturated hydrocarbon portion in a hydrocarbon chain at an end of a mesogenic skeleton composed of a plurality of rings. Specifically, compounds represented by general formula (II)

[Chem. 14]

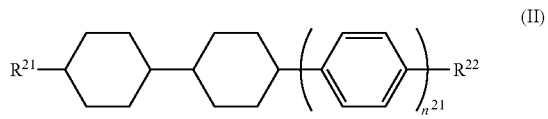
(II)

are included.

In the formula, $R^{21}$ represents an alkenyl group having 2 to 10 carbon atoms, and is preferably an alkenyl group having 2 to 5 carbon atoms. $R^{22}$ represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —$CH_2$— or each of at least two —$CH_2$— that do not adjoin, which is present in $R^{22}$, may be substituted with —O— and/or —S—, and each of at least one hydrogen atom present in $R^{22}$ may be substituted with a fluorine atom or a chlorine atom. However, an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms is preferable. $n^{21}$ represents 0 or 1.

Among the compounds represented by general formula (II), general formula (II-11) and general formula (II-12)

[Chem. 15]

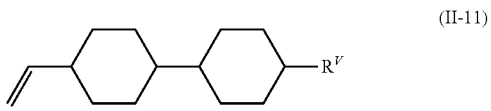
(II-11)

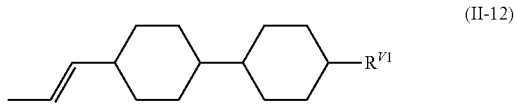
(II-12)

(in the formulae, each of $R^V$ and $R^{V1}$ independently represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms) are preferable.

The compounds represented by general formula (II-11) and or general formula (II-12) are preferably formula (II-101) to formula (II-110), for example.

[Chem. 16]

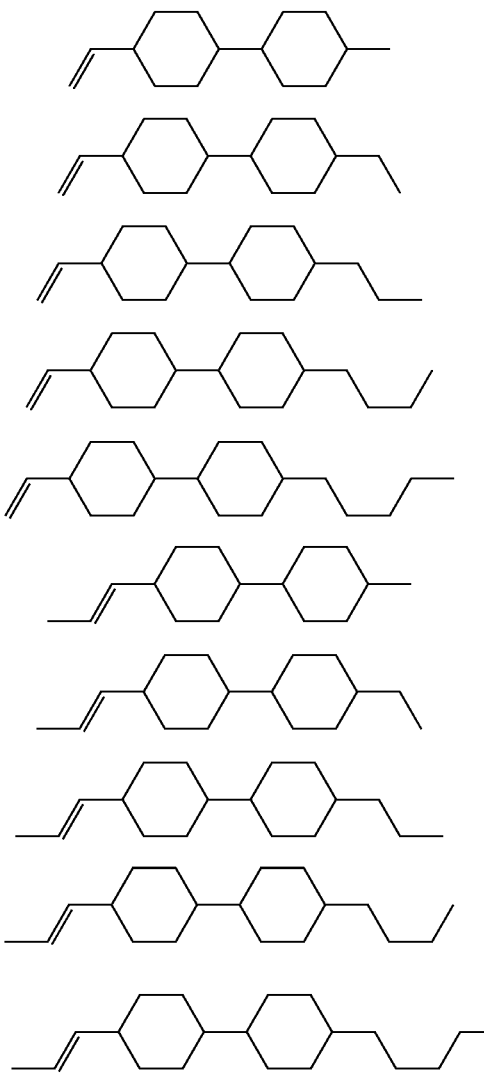

(II-101)
(II-102)
(II-103)
(II-104)
(II-105)
(II-106)
(II-107)
(II-108)
(II-109)
(II-110)

Regarding the second component, 1 to 60 percent by mass of compound represented by general formula (II) is contained, 5 to 60 percent by mass is preferable, 10 to 60 percent by mass is preferable, 20 to 60 percent by mass is preferable, 30 to 60 percent by mass is preferable, and 40 to 60 percent by mass is preferable. In more detail, in order to obtain a high response speed, the content is preferably 20 to 60 percent by mass. However, in the case where emphasis is placed on suppression of precipitation at low temperatures, the content is preferably 5 to 40 percent by mass. Also, in the case where emphasis is placed on a high voltage holding rate (VHR), it is preferable that 5 to 30 percent by mass of compound represented by general formula (IT) be contained.

The liquid crystal composition containing a polymerizable compound according to the present invention can contain a compound represented by general formula (III-1) and general formula (III-2)

[Chem. 17]

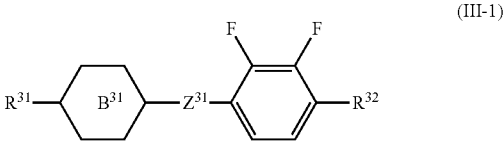

(III-1)

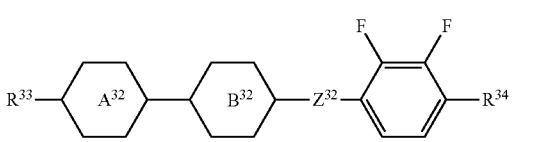

(III-2)

as a third component.

In the formulae, each of $R^{31}$ to $R^{34}$ independently represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —$CH_2$— or each of at least two —$CH_2$— that do not adjoin, which is present in $R^{31}$ to $R^{34}$, may be substituted with —O— and/or —S—, and each of at least one hydrogen atom present in $R^{31}$ to $R^{34}$ may be independently substituted with a fluorine atom or a chlorine atom. However, each of $R^{31}$ and $R^{33}$ is independently preferably an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms, further preferably an alkyl group having 1 to 5 carbon atoms or an alkenyl group having 2 to 5 carbon atoms, and further preferably an alkyl group having 1 to 3 carbon atoms or an alkenyl group having 2 to 3 carbon atoms. Each of $R^{32}$ and $R^{34}$ is independently preferably an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms, and further preferably an alkyl group having 1 to 5 carbon atoms or an alkoxyl group having 1 to 5 carbon atoms.

Each of ring $A^{32}$, ring $B^{31}$, and ring $B^{32}$ independently represents a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, decahydronaphthalene-2,6-diyl group, or a 1,2,3,4-tetrahydronaphthalene-2,6-diyl group. A trans-1,4-cyclohexylene group or a 1,4-phenylene group is preferable.

Each of $Z^{31}$ and $Z^{32}$ independently represents —$OCH_2$—, —$CH_2O$—, —$CF_2O$—, —$OCF_2$—, —$CH_2CH_2$—, —$CF_2CF_2$—, or a single bond. However, —$CH_2O$—, —$CF_2O$—, —$CH_2CH_2$—, —$CF_2CF_2$—, or a single bond is preferable, —$CH_2O$—, —$CH_2CH_2$—, or a single bond is further preferable, and —$CH_2O$— or a single bond is particularly preferable.

Specifically, the compounds represented by general formula (III-1) are preferably compounds represented by general formula (III-A1) to general formula (III-A4) below, preferably compounds represented by general formula (III-A1), preferably compounds represented by general formula (III-A3), preferably compounds represented by general formula (III-A4), further preferably compounds represented by general formula (III-A1), and further preferably compounds represented by general formula (III-A3).

[Chem. 18]

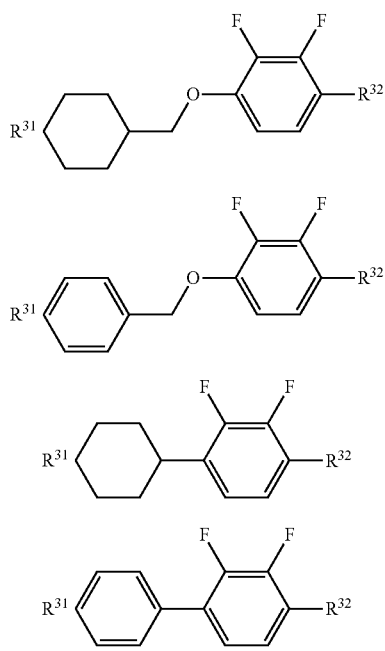

(III-A1)
(III-A2)
(III-A3)
(III-A4)

In the formulae, each of $R^{31}$ and $R^{32}$ represents the same as that described above.

Specifically, the compounds represented by general formula (III-2) are preferably compounds represented by general formula (III-B1) to general formula (III-B6) below, preferably compounds represented by general formula (III-B1), preferably compounds represented by general formula (III-B3), preferably compounds represented by general formula (III-B4), preferably compounds represented by general formula (III-B5), preferably compounds represented by general formula (III-B6), further preferably compounds represented by general formula (III-B1), and further preferably compounds represented by general formula (III-B3), further preferably compounds represented by general formula (III-B5), further preferably compounds represented by general formula (III-B6), particularly preferably compounds represented by general formula (III-31), and particularly preferably compounds represented by general formula (III-B5).

[Chem. 19]

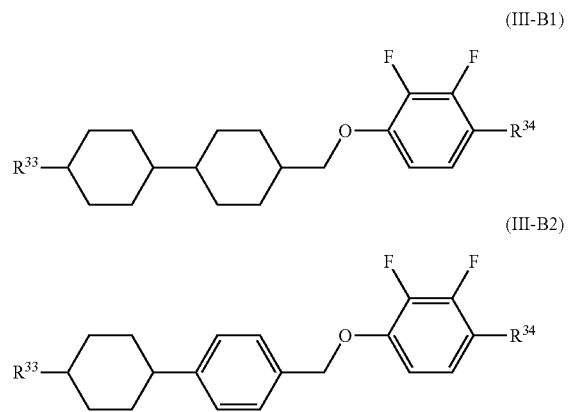

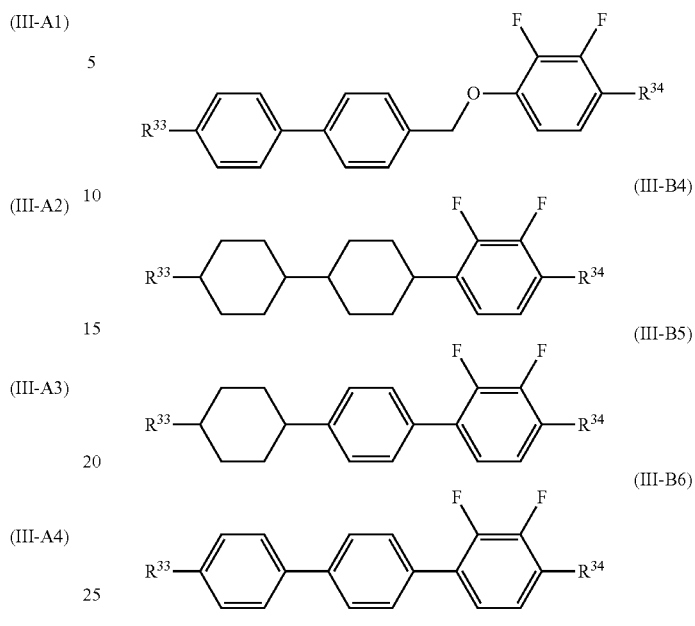

(III-B1)
(III-B2)
(III-B3)
(III-B4)
(III-B5)
(III-B6)

In the formulae, each of $R^{33}$ and $R^{34}$ represents the same as that described above.

For more details, the third component is preferably a combination of general formula (III-A1) and general formula (III-B1), further preferably a combination of general formula (III-A1), general formula (III-B1), and general formula (III-B4), and further preferably a combination of general formula (III-A1), general formula (III-B1), and general formula (III-B5).

For more details, the third component is preferably a combination of general formula (III-A3) and general formula (III-B5), further preferably a combination of general formula (III-A3), general formula (III-B4), and general formula (III-B5), and further preferably a combination of general formula (III-A3), general formula (III-B5), and general formula (III-B1).

For more details, the third component is preferably a combination of general formula (III-A4) and general formula (III-B1), further preferably a combination of general formula (III-A4), general formula (III-A1), and general formula (III-B1), preferably a combination of general formula (III-A4) and general formula (III-B5), preferably a combination of general formula (III-A4), general formula (III-B5), and general formula (III-B4), preferably a combination of general formula (III-A4) and general formula (III-B1), and further preferably a combination of general formula (III-A4), general formula (III-B1), and general formula (III-B5).

The liquid crystal composition containing a polymerizable compound according to the present invention contains at least one of compounds represented by general formula (III-1) and general formula (III-2), and preferably contains 2 types to 10 types. The content thereof is preferably 10 to 90 percent by mass, further preferably 20 to 80 percent by mass, and particularly preferably 30 to 70 percent by mass.

The liquid crystal composition containing a polymerizable compound according to the present invention preferably contains at least one compound selected from the compounds represented by general formula (IV-A) to general formula (IV-J)

[Chem. 20]

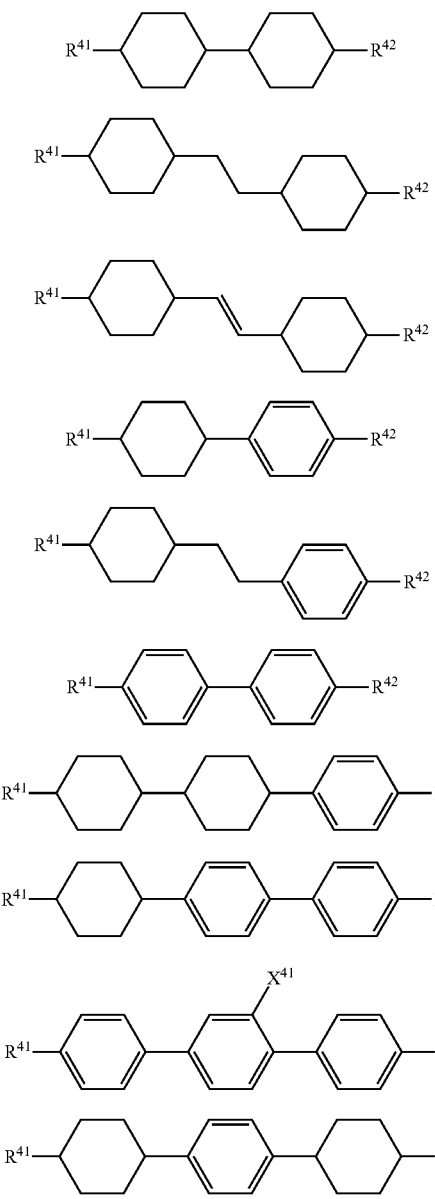

as another component.

In the formulae, each of $R^{41}$ and $R^{42}$ independently represents an alkyl group having 1 to 5 carbon atoms or an alkoxy group having 1 to 5 carbon atoms, and is preferably an alkyl group having 2 to 4 carbon atoms or an alkoxy group having 1 to 3 carbon atoms.

$X^{41}$ represents an alkyl group having 1 to 3 carbon atoms, alkoxy group having 1 to 3 carbon atoms, a fluorine atom, or a hydrogen atom, and is preferably a methyl group, a fluorine atom, or a hydrogen atom, and further preferably a fluorine atom or a hydrogen atom.

In this regard, each of $R^{41}$ and $R^{42}$ in general formula (IV-F), general formula (IV-G), general formula (IV-H), and general formula (IV-I) may be an alkenyl group having 2 to 5 carbon atoms or an alkenyloxy group having 2 to 5 carbon atoms.

Compounds selected from general formula (IV-A), general formula (IV-D), general formula (IV-F), general formula (IV-G), general formula (IV-H), and general formula (IV-I) among general formula (IV-A) to general formula (IV-J) are preferable, compounds selected from general formula (IV-A), general formula (IV-F), general formula (IV-G), general formula (IV-H), and general formula (IV-I) are further preferable, compounds selected from general formula (IV-F), general formula (IV-H), and general formula (IV-I) are further preferable, and compounds selected from general formula (III-F) and general formula (III-H) are particularly preferable.

The content of the compounds selected from the compound group represented by general formula (IV-A) to general formula (IV-J) is 1 percent by mass to 60 percent by mass, preferably 5 percent by mass to 50 percent by mass, preferably 5 percent by mass to 40 percent by mass, preferably 10 percent by mass to 40 percent by mass, and preferably 10 percent by mass to 30 percent by mass.

The liquid crystal composition containing a polymerizable compound according to the present invention can further contain at least one of compounds represented by general formula (V).

[Chem. 21]

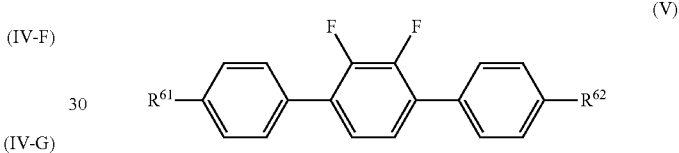

In the formula, each of $R^{61}$ and $R^{62}$ independently represents an alkyl group having 1 to 8 carbon atoms, an alkoxyl group having 1 to 8 carbon atoms, an alkenyl group having 2 to 8 carbon atoms, or an alkenyloxy group having 2 to 8 carbon atoms, and is preferably an alkyl group having 1 to 5 carbon atoms or an alkenyl group having 2 to 5 carbon atoms.

The liquid crystal composition containing a polymerizable compound according to the present invention may contain at least one of compounds represented by general formula (N-001).

[Chem. 22]

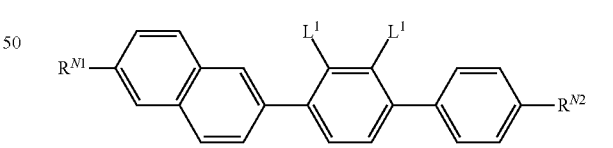

In the formula, each of $R^{N1}$ and $R^{N2}$ independently represents an alkyl group having 1 to 8 carbon atoms, an alkoxyl group having 1 to 8 carbon atoms, an alkenyl group having 2 to 8 carbon atoms, or an alkenyloxy group having 2 to 8 carbon atoms, and is preferably an alkyl group having 1 to 5 carbon atoms.

In the formula, each of $L^1$ and $L^2$ independently represents a hydrogen atom, a fluorine atom, $CH_3$, or $CF_3$, and at least one of $L^1$ and $L^2$ is preferably a fluorine atom. It is also preferable that both be a fluorine atom.

The liquid crystal composition containing a polymerizable compound according to the present invention can also contain at least one of compounds represented by general formula (VIII-a), general formula (VIII-c), and general formula (VIII-d).

[Chem. 23]

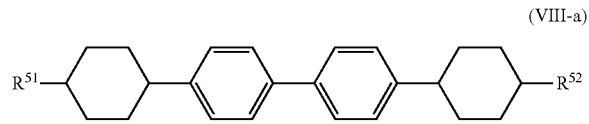

(VIII-a)

In the formula, each of $R^{51}$ and $R^{52}$ independently represents an alkyl group having 1 to 5 carbon atoms, an alkenyl group having 2 to 5 carbon atoms, or an alkoxy group having 1 to 4 carbon atoms.

[Chem. 24]

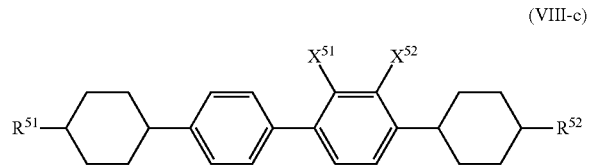

(VIII-c)

In the formula, each of $R^{51}$ and $R^{52}$ represents the same as that described above, each of $X^{51}$ and $X^{52}$ independently represents a fluorine atom or a hydrogen atom, and at least one of $X^{51}$ and $X^{52}$ is a fluorine atom.

[Chem. 25]

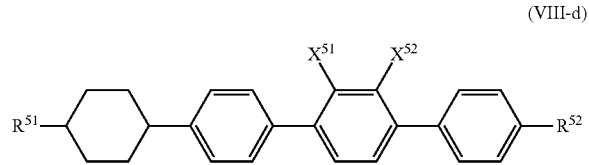

(VIII-d)

In the formula, each of $R^{51}$ and $R^{52}$ represents the same as that described above, and each of $X^{51}$ and $X^{52}$ represents the same as that described above.

The liquid crystal composition containing a polymerizable compound according to the present invention may contain at least one of compounds represented by formula (V-9.1) to formula (V-9.3).

The liquid crystal composition containing a polymerizable compound according to the present invention preferably contains compounds represented by formula (I-1), formula (II), general formula (III-A1), and general formula (IV-F) at the same time, preferably contains compounds represented by formula (I-1), formula (II), general formula (III-A3), and general formula (IV-F) at the same time, preferably contains compounds represented by formula (I-1), formula (II), general formula (III-A4), and general formula (IV-F) at the same time, preferably contains compounds represented by formula (I-1), formula (II), general formula (III-B1), and general formula (IV-F) at the same time, preferably contains compounds represented by formula (I-1), formula (II), general formula (III-B3), and general formula (IV-F) at the same time, preferably contains compounds represented by formula (I-1), formula (II), general formula (III-B4), and general formula (IV-F) at the same time, and preferably contains compounds represented by formula (I-1), formula (II), general formula (III-B5), and general formula (IV-F) at the same time.

The liquid crystal composition containing a polymerizable compound according to the present invention further preferably contains compounds represented by formula (I-1), formula (II), general formula (III-A1), general formula (III-B1), and general formula (IV-F) at the same time, further preferably contains compounds represented by formula (I-1), formula (II), general formula (III-A3), general formula (III-B5), and general formula (IV-F) at the same time, further preferably contains compounds represented by formula (I-1), formula (II), general formula (III-A1), general formula (III-B4), and general formula (IV-F) at the same time, and further preferably contains compounds represented by formula (I-1), formula (II), general formula (III-A1), general formula (III-B5), and general formula (IV-F) at the same time.

The liquid crystal composition containing a polymerizable compound according to the present invention preferably contains compounds represented by formula (I-1), formula (II), general formula (III-A1), and general formula (IV-H) at the same time, preferably contains compounds represented by formula (I-1), formula (II), general formula (III-A3), and general formula (IV-H) at the same time, preferably contains compounds represented by formula (I-1), formula (II), general formula (III-A4), and general formula (IV-H) at the same time, preferably contains compounds represented by formula (I-1), formula (II), general formula (III-B1), and general formula (IV-H) at the same time, preferably contains compounds represented by formula (I-1), formula (II), general formula (III-B3), and general formula (IV-H) at the same time, preferably contains compounds represented by

[Chem. 26]

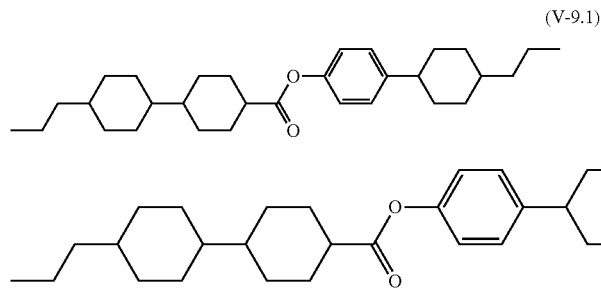

(V-9.1)

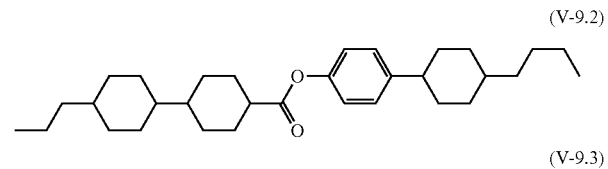

(V-9.2)

(V-9.3)

formula (I-1), formula (II), general formula (III-B4), and general formula (IV-H) at the same time, and preferably contains compounds represented by formula (I-1), formula (II), general formula (III-B5), and general formula (IV-H) at the same time.

The liquid crystal composition containing a polymerizable compound according to the present invention further preferably contains compounds represented by formula (I-1), formula (II), general formula (III-A1), general formula (III-B1), and general formula (IV-H) at the same time, further preferably contains compounds represented by formula (I-1), formula (II), general formula (III-A3), general formula (III-B5), and general formula (IV-H) at the same time, further preferably contains compounds represented by formula (I-1), formula (II), general formula (III-A1), general formula (III-B4), and general formula (IV-H) at the same time, and further preferably contains compounds represented by formula (I-1), formula (II), general formula (III-A1), general formula (III-B5), and general formula (IV-H) at the same time.

The liquid crystal composition containing a polymerizable compound according to the present invention preferably contains compounds represented by formula (I-1), formula (II), general formula (III-A1), and general formula (IV-A) at the same time, preferably contains compounds represented by formula (I-1), formula (II), general formula (III-A3), and general formula (IV-A) at the same time, preferably contains compounds represented by formula (I-1), formula (II), general formula (III-A4), and general formula (IV-A) at the same time, preferably contains compounds represented by formula (I-1), formula (II), general formula (III-B1), and general formula (IV-A) at the same time, preferably contains compounds represented by formula (I-1), formula (II), general formula (III-B3), and general formula (IV-A) at the same time, preferably contains compounds represented by formula (I-1), formula (II), general formula (III-B4), and general formula (IV-A) at the same time, and preferably contains compounds represented by formula (I-1), formula (II), general formula (III-B5), and general formula (IV-A) at the same time.

The liquid crystal composition containing a polymerizable compound according to the present invention further preferably contains compounds represented by formula (I-1), formula (II), general formula (III-A1), general formula (III-B1), and general formula (IV-A) at the same time, further preferably contains compounds represented by formula (I-1), formula (II), general formula (III-A3), general formula (III-B5), and general formula (IV-A) at the same time, further preferably contains compounds represented by formula (I-1), formula (II), general formula (III-A1), general formula (III-B4), and general formula (IV-A) at the same time, and further preferably contains compounds represented by formula (I-1), formula (II), general formula (III-A1), general formula (III-B5), and general formula (IV-A) at the same time.

The liquid crystal composition containing a polymerizable compound according to the present invention contains a polymerizable compound represented by general formula (I), but can also contain other polymerizable compounds together.

In that case, compounds represented by general formula (I-31) and general formula (I-32)

[Chem. 27]

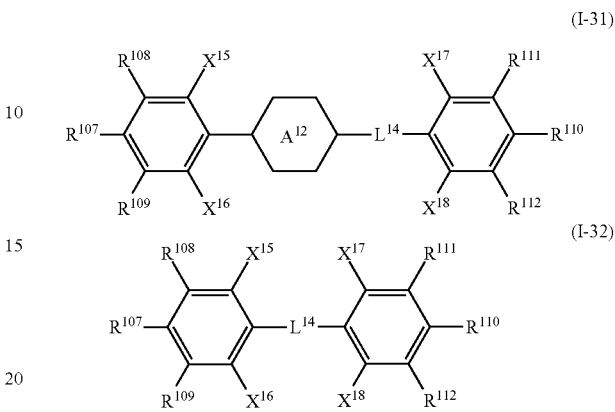

are preferable.

In the formulae, $R^{107}$ represents $P^{107}$—$S^{107}$—, $R^{110}$ represents $P^{110}$—$S^{110}$—, each of $P^{107}$ and $P^{110}$ represents any one of formula (R-1) to formula (R-15), each of $S^{107}$ and $S^{110}$ independently represents a single bond or an alkylene group having 1 to 15 carbon atoms, and at least one —$CH_2$— in the alkylene group may be substituted with —O—, —OCO—, or —COO— such that oxygen atoms do not directly adjoin. Each of $S^{107}$ and $S^{110}$ is preferably a single bond, an alkylene group having 1 to 6 carbon atoms, or an alkylene group having 1 to 6 carbon atoms, in which at least one —$CH_2$— in the alkylene group is substituted with —O— such that oxygen atoms do not directly adjoin, and particularly preferably a single bond. In the formulae, each of $R^{108}$, $R^{109}$, $R^{111}$, and $R^{112}$ independently represents any one of formula (R-1) to formula (R-15), an alkyl group having 1 to 3 carbon atoms, an alkoxy group having 1 to 3 carbon atoms, a fluorine atom, or a hydrogen atom, $A^{12}$ represents a 1,4-phenylene group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, in which the group may be unsubstituted or may be substituted with an alkyl group having 1 to 12 carbon atoms, an alkoxyl group having 1 to 12 carbon atoms, a halogen, a cyano group, or a nitro group, and $L^{14}$ represents a single bond, —$OCH_2$—, —$CH_2O$—, —$C_2H_4$—, —COO—, —OCO—, —CH=$CR^a$—COO—, —CH=$CR^a$—OCO—, —COO—$CR^a$=CH—, —OCO—$CR^a$=CH—, —$(CH_2)_z$—COO—, —$(CH_2)_z$—OCO—, —OCO—$(CH_2)_z$—, —COO—$(CH_2)_z$—, —CH=CH—, —$CF_2O$—, —$OCF_2$—, or —C≡C— (in the formulae, each $R^a$ independently represents a hydrogen atom or an alkyl group having 1 to 3 carbon atoms, and in the formulae, z represents an integer of 1 to 4).

The polymerizable compounds represented by general formula (I-31) and general formula (I-32) have a mesogenic structure including two or three rings and can further improve the compatibility of the liquid crystal composition by being used in combination with the polymerizable compound represented by general formula (I-1) serving as the first component of the liquid crystal composition according to the present invention.

The content of the polymerizable compounds represented by general formula (I-31) and general formula (I-32) is preferably 0 to 2.00 percent by mass, further preferably 0.01 to 1.00 percent by mass, and particularly preferably 0.02 to 0.60 percent by mass.

The compounds represented by general formula (I-32) are preferably compounds represented by, for example, formula (XX-1) to (XX-10), and further preferably formula (XX-1) to (XX-4).

[Chem. 28]

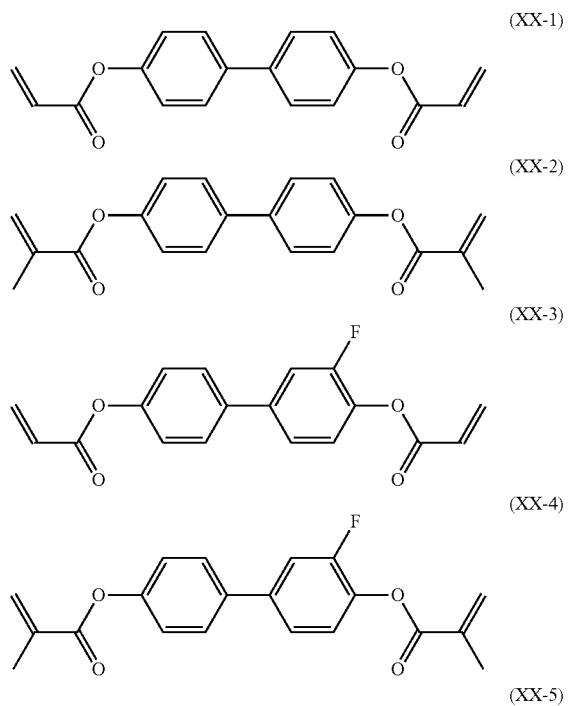

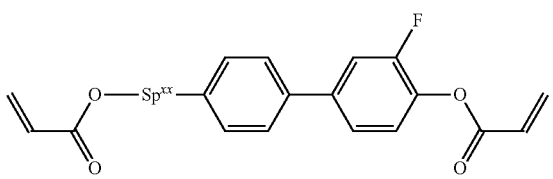

In formula (XX-1) to (XX-10), $Sp^{xx}$ represents an alkylene group having 1 to 8 carbon atoms or $-O-(CH_2)_s-$ (in the formula, s represents an integer of 2 to 7, and the oxygen atom is bonded to a ring).

In formula (XX-1) to formula (XX-10), a hydrogen atom in a 1,4-phenylene group may be further substituted with any one of $-F$, $-Cl$, $-CF_3$, $-CH_3$, and formula (R-1) to formula (R-15).

The compounds represented by general formula (I-32) are preferably compounds represented by, for example, formula (M31) to (M48).

[Chem. 29]

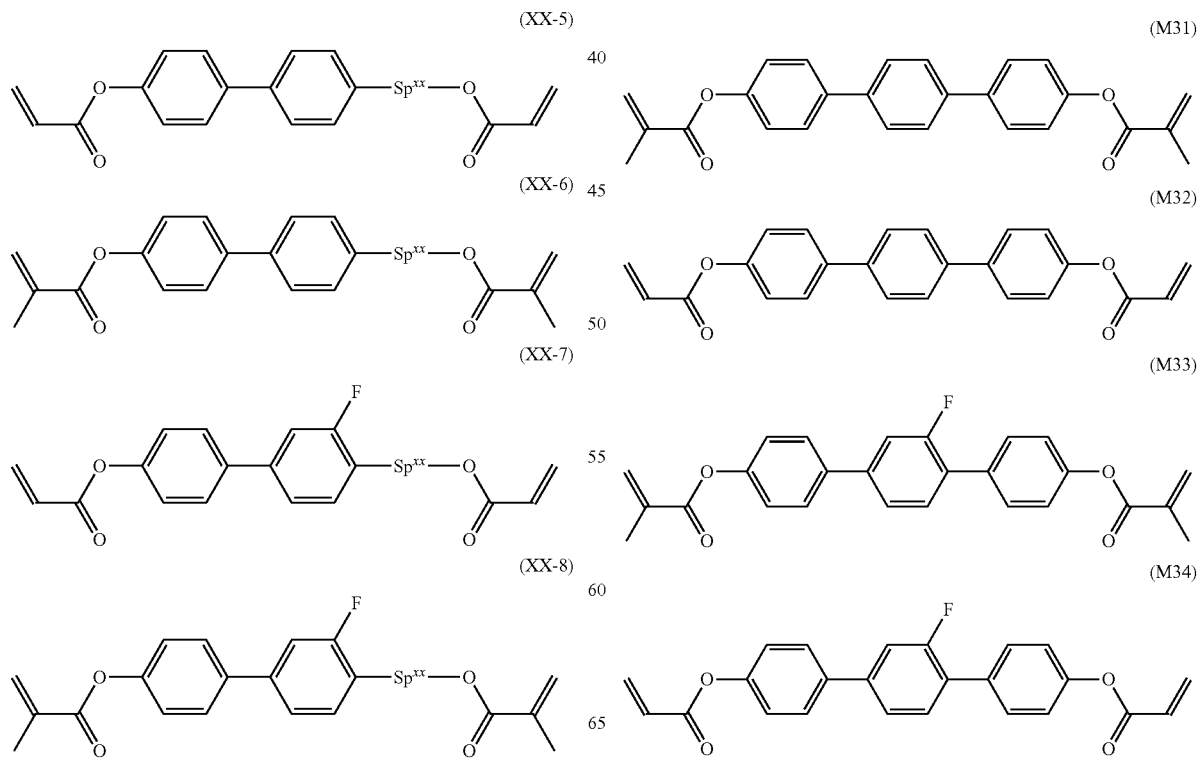

(M35)
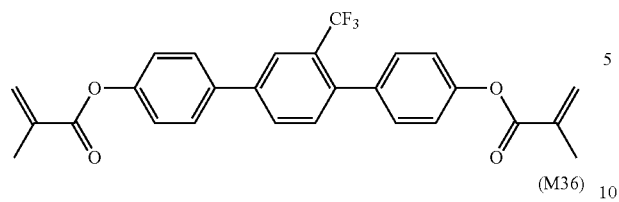
(M36)
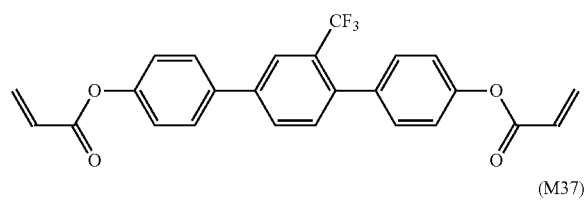
(M37)
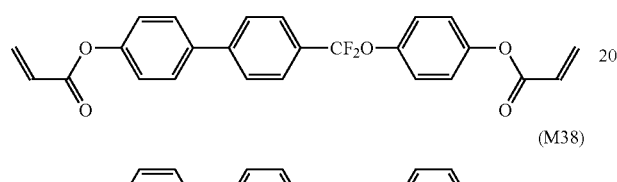
(M38)
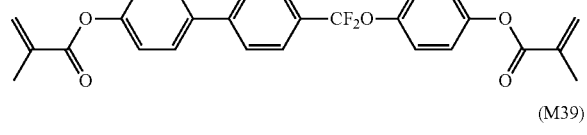
(M39)
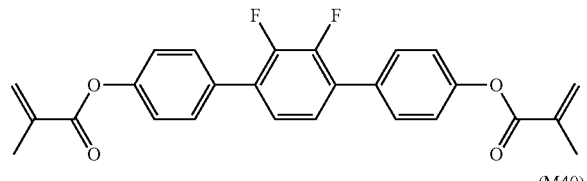
(M40)
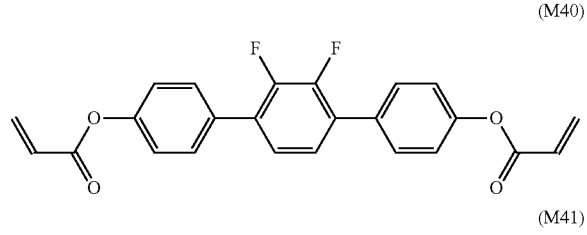
(M41)
(M42)
(M43)
(M44)
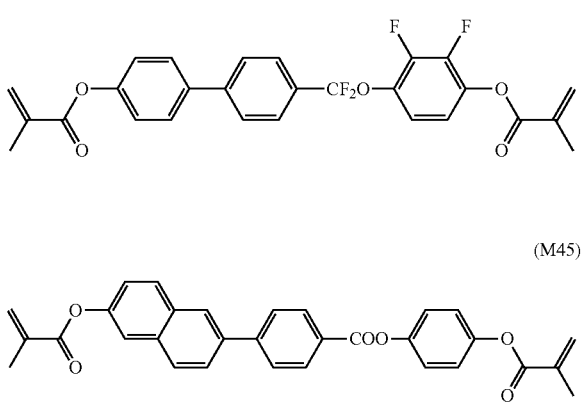
(M45)
(M46)
(M47)
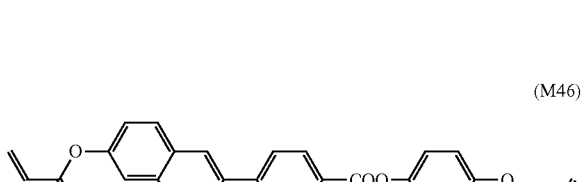
(M48)
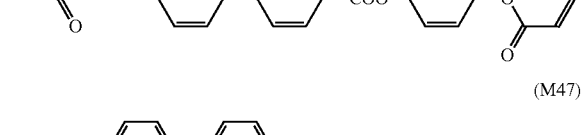
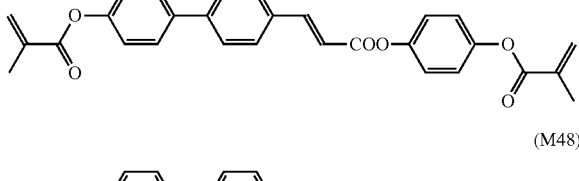
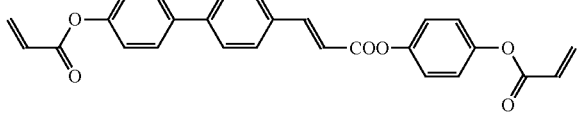
Also, polymerizable compounds represented by formula (M301) to formula (M316) are preferable.
[Chem. 30]
(M301)
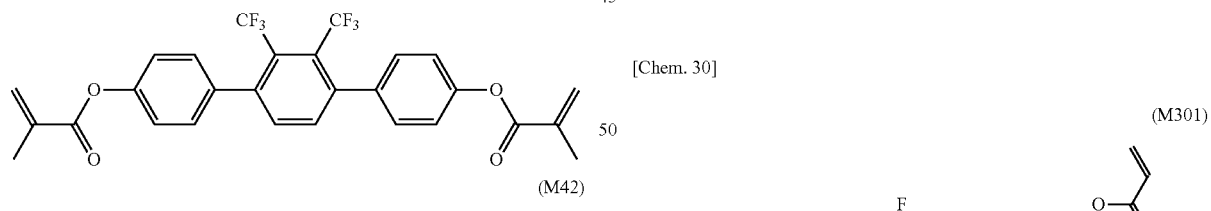
(M302)
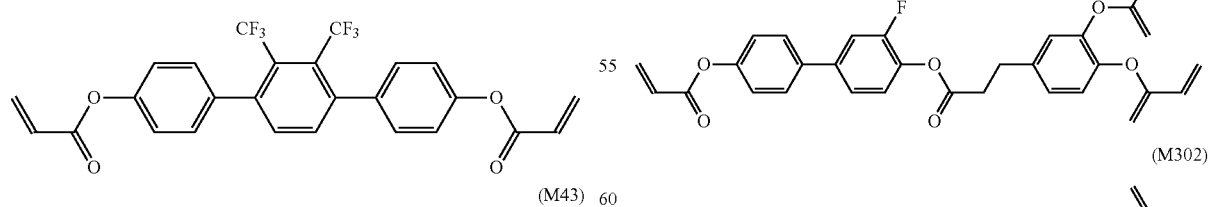
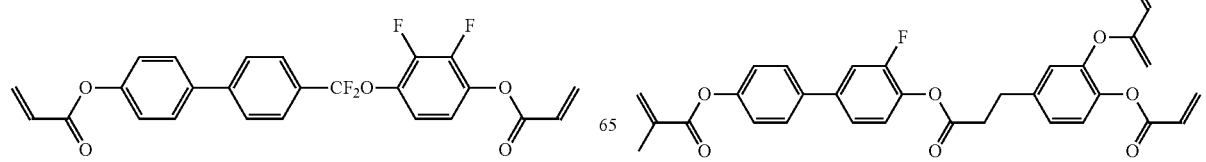

(M303)
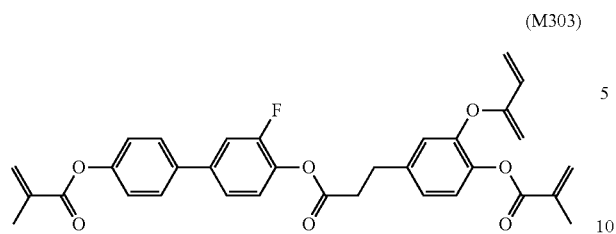
(M309)
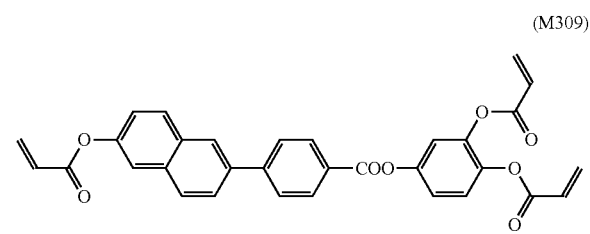
(M304)
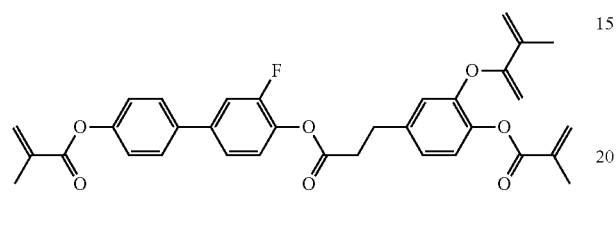
(M310)
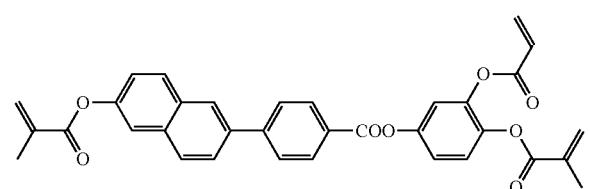
(M305)
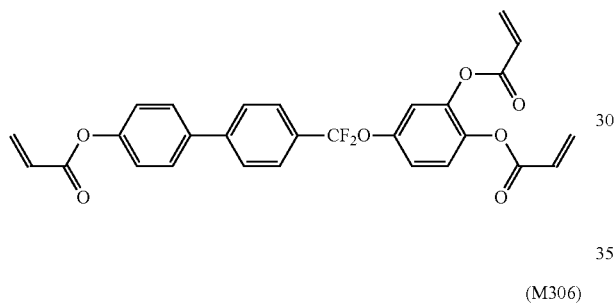
(M311)
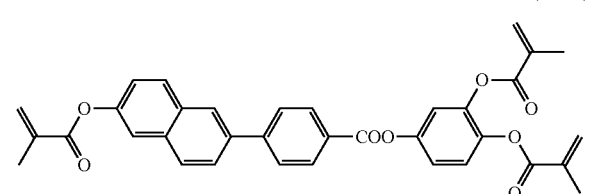
(M306)
(M307)
(M312)
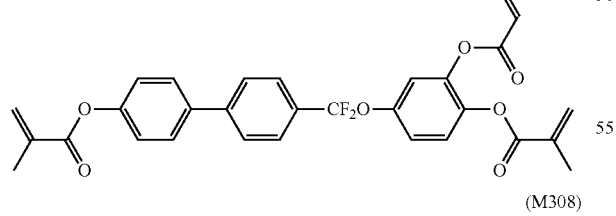
(M308)
(M313)
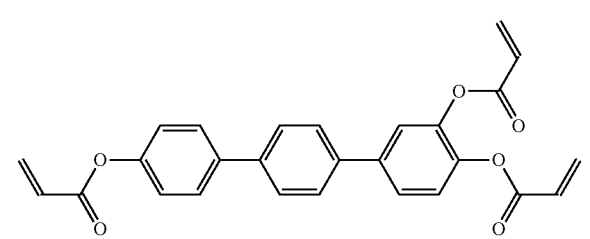

(M314)
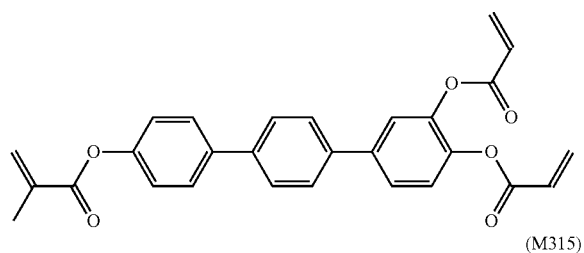
(M316)
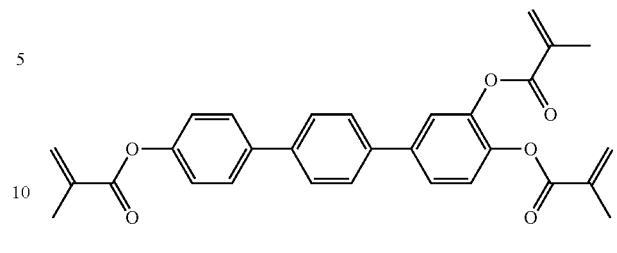
(M315)
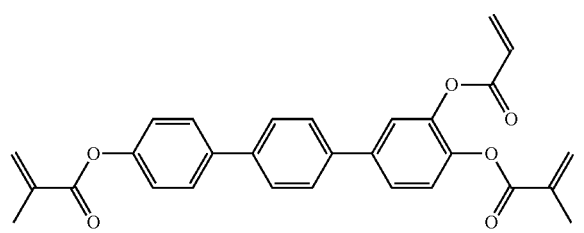
In formula (M301) to formula (M316), hydrogen atom in a 1,4-phenylene group and a naphthalene group may be further substituted with any one of —F, —Cl, —CF$_3$, and —CH$_3$.
Also, polymerizable compounds represented by formula (Ia-1) to formula (Ia-31) are preferable.
[Chem. 31]
(Ia-1)
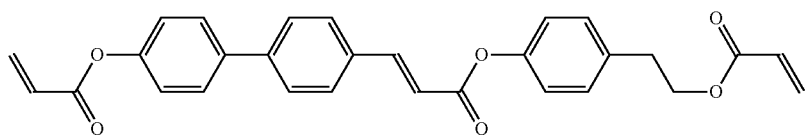
(Ia-2)
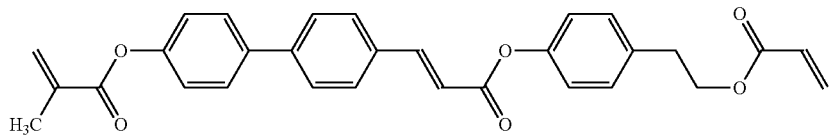
(Ia-3)
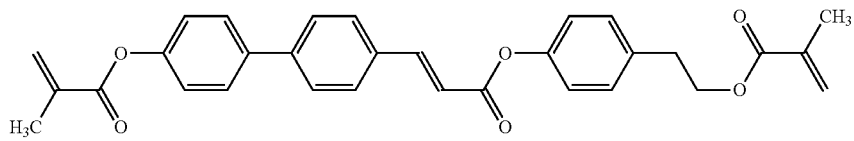
(Ia-4)
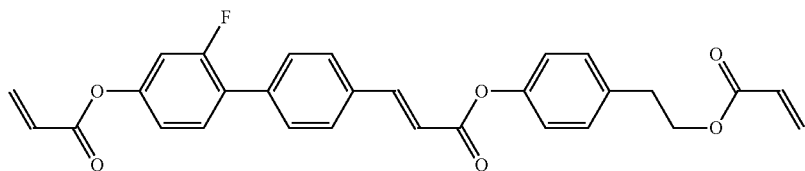
(Ia-5)
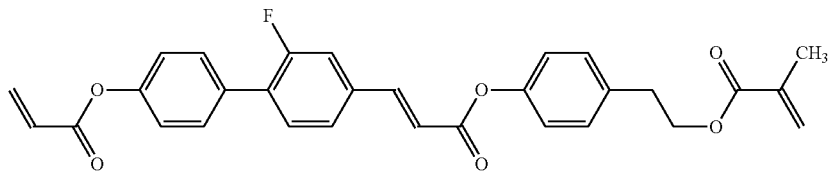
(Ia-6)
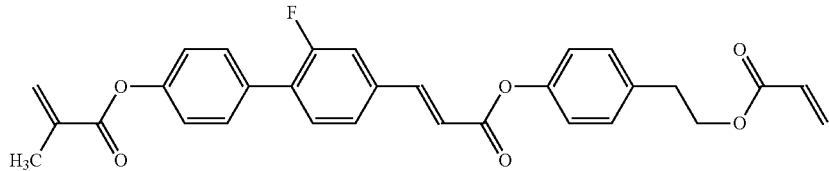

-continued
(Ia-7)
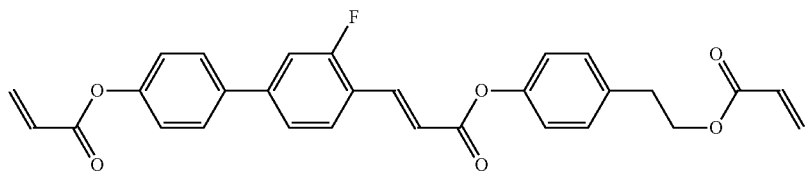
(Ia-8)
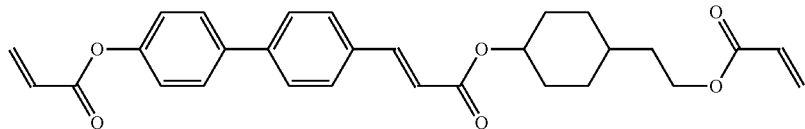
(Ia-9)
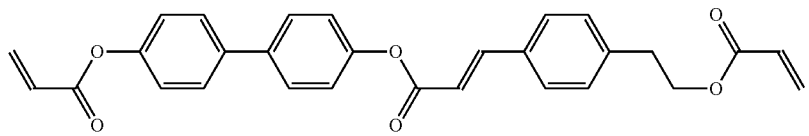
(Ia-10)
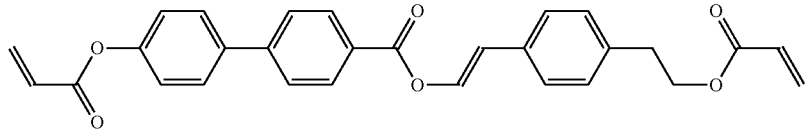
(Ia-11)
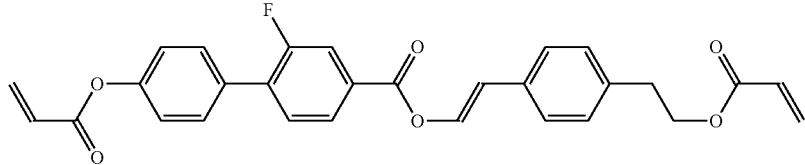
(Ia-12)
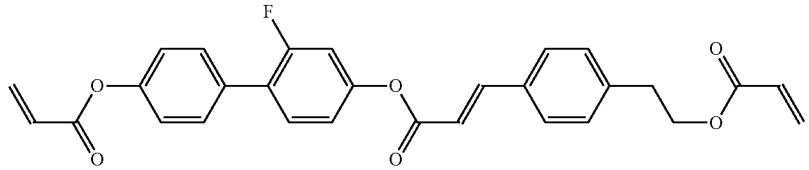
(Ia-13)
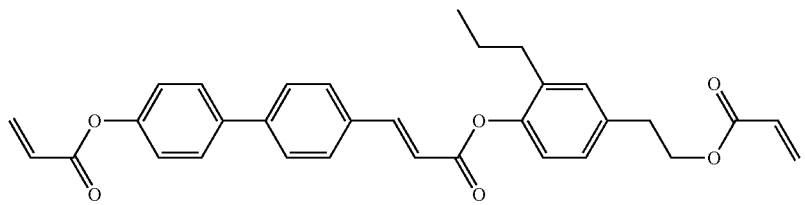
[Chem.32]
(Ia-14)
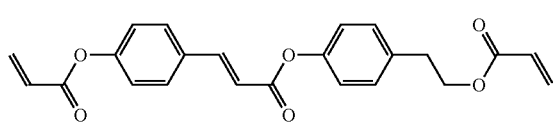
(Ia-15)
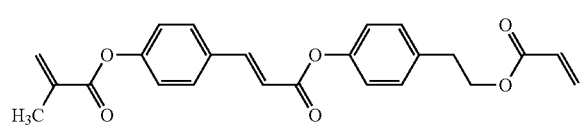
(Ia-16)
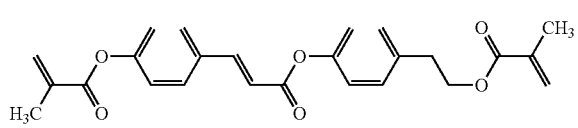
(Ia-17)
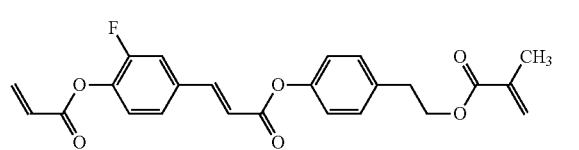

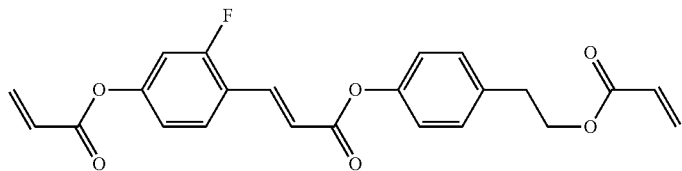
(Ia-18)
[Chem.33]
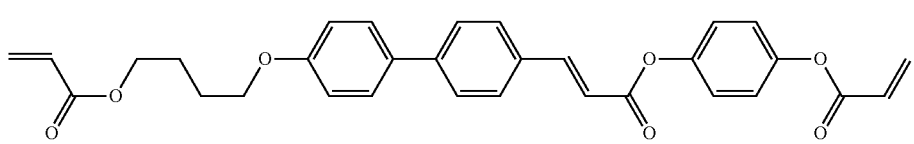
(Ia-19)
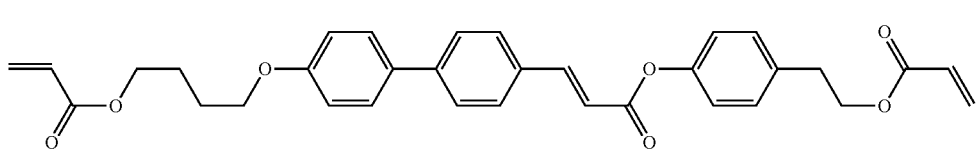
(Ia-20)
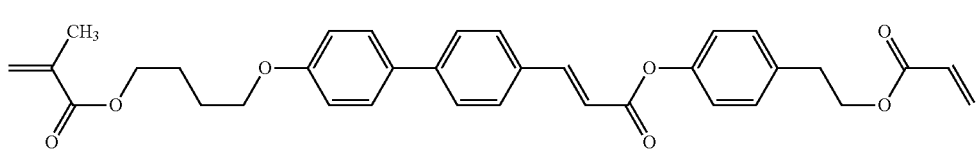
(Ia-21)
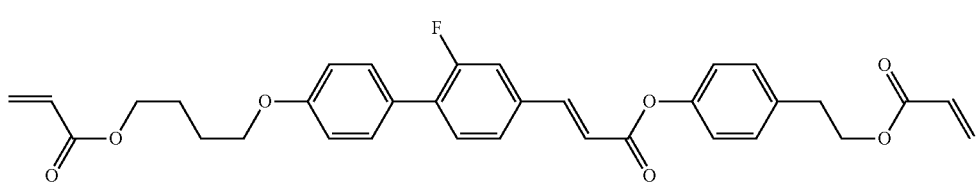
(Ia-22)
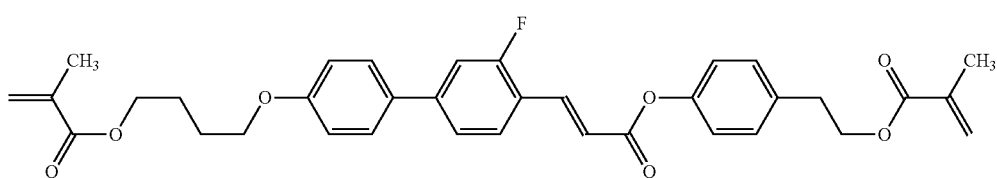
(Ia-23)
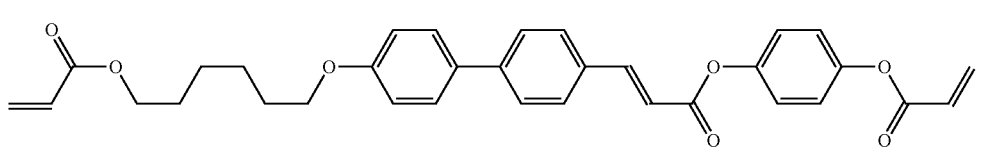
(Ia-24)
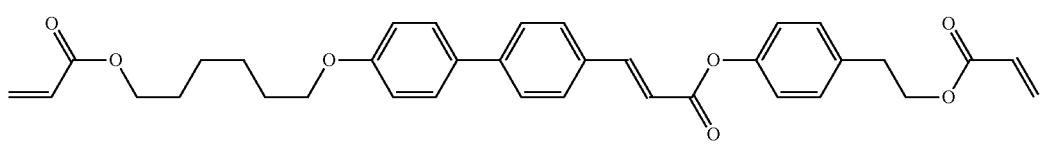
(Ia-25)
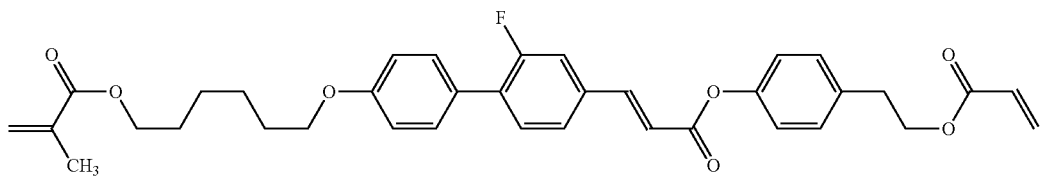
(Ia-26)

-continued (Ia-27)
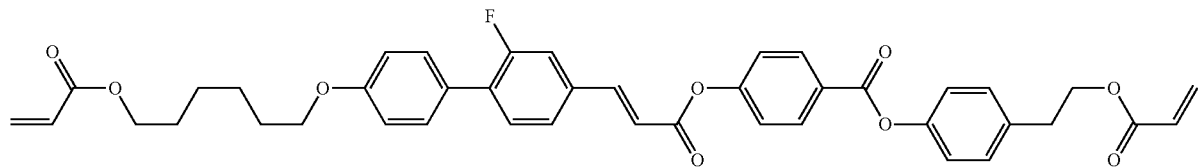

(Ia-28)
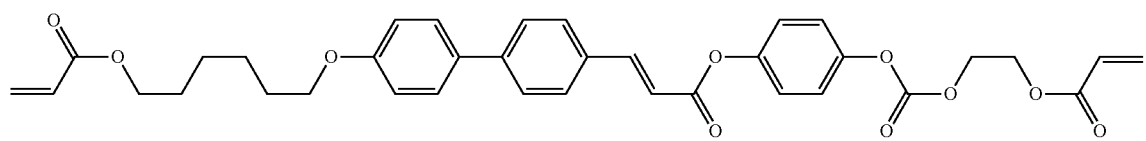

(Ia-29)
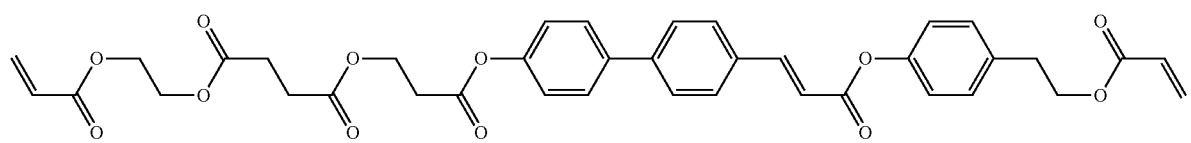

(Ia-30)
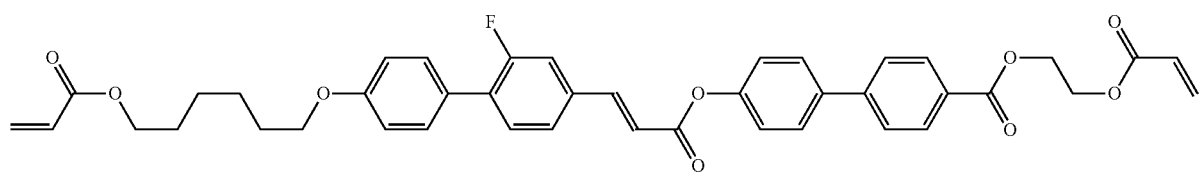

[Chem. 34]

(Ia-31)
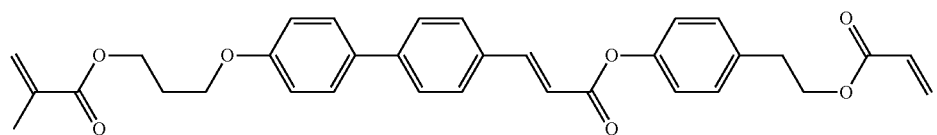

The liquid crystal composition containing a polymerizable compound according to the present invention may contain common nematic liquid crystals, smectic liquid crystals, cholesteric liquid crystals, antioxidants, ultraviolet absorbers, light stabilizers or infrared absorbents, and the like in addition to the above-described compounds.

Examples of antioxidants include hindered phenols represented by general formula (H-1) to general formula (H-4).

[Chem. 35]

(H-1)
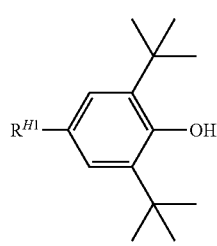

-continued (H-2)
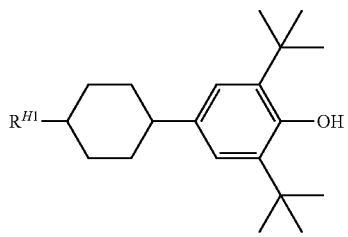

(H-3)
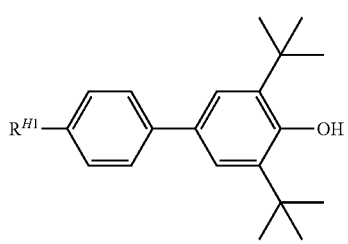

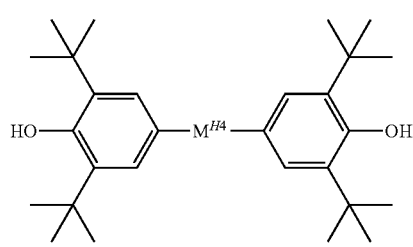
(H-4)

In general formula (H-1) to general formula (H-4), $R^{H1}$ represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —CH$_2$— or each of at least two —CH$_2$— that do not adjoin, which is present in the group, may be independently substituted with —O— or —S—, and each of at least one hydrogen atom present in the group may be independently substituted with a fluorine atom or a chlorine atom. Specifically, an alkyl group having 2 to 7 carbon atoms, an alkoxyl group having 2 to 7 carbon atoms, an alkenyl group having 2 to 7 carbon atoms, or an alkenyloxy group having 2 to 7 carbon atoms is preferable, and an alkyl group having 3 to 7 carbon atoms or an alkenyl group having 2 to 7 carbon atoms is further preferable.

In general formula (H-4), MH$^4$ represents an alkylene group having 1 to 15 carbon atoms (at least one —CH$_2$— in the alkylene group may be substituted with —O—, —CO—, —COO—, or —OCO— such that oxygen atoms do not directly adjoin), —OCH$_2$—, —CH$_2$O—, —COO—, —OCO—, —CF$_2$O—, —OCF$_2$—, —CH$_2$CF$_2$—, —CH=CH—COO—, —CH=CH—OCO—, —COO—CH=CH—, —OCO—CH=CH—, —CH=CH—, —C≡C—, a single bond, a 1,4-phenylene group (any hydrogen atom in the 1,4-phenylene group may be substituted with a fluorine atom), or a trans-1,4-cyclohexylene group. An alkylene group having 1 to 14 carbon atoms is preferable. The number of carbon atoms is further preferably 2 to 12, the number of carbon atoms is further preferably 3 to 10, the number of carbon atoms is further preferably 4 to 10, the number of carbon atoms is further preferably 5 to 10, and the number of carbon atoms is further preferably 6 to 10 because the number of carbon atoms is preferably large in consideration of the volatility but it is preferable that the number of carbon atoms be not excessively large in consideration of the viscosity.

In general formula (H-1) to general formula (H-4), one —CH= or at least two —CH= that do not adjoin in a 1,4-phenylene group may be substituted with —N=. Also, each of hydrogen atoms in a 1,4-phenylene group may be independently substituted with a fluorine atom or a chlorine atom.

In general formula (H-1) to general formula (H-4), one —CH$_2$— or at least two —CH$_2$— that do not adjoin in a 1,4-cyclohexylene group may be substituted with —O— or —S—. Also, each of hydrogen atoms in a 1,4-cyclohexylene group may be independently substituted with a fluorine atom or a chlorine atom.

Specific examples include formula (H-11) to formula (H-15).

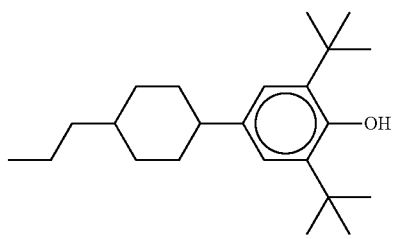
(H-11)

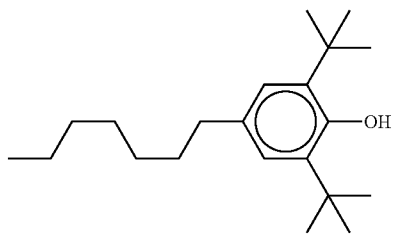
(H-12)

(H-13)
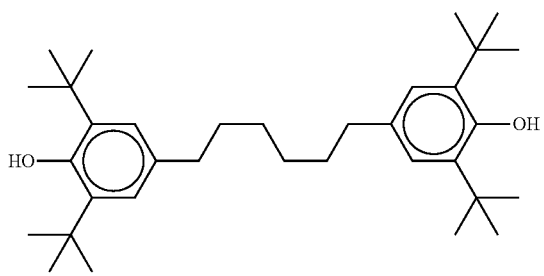

(H-14)
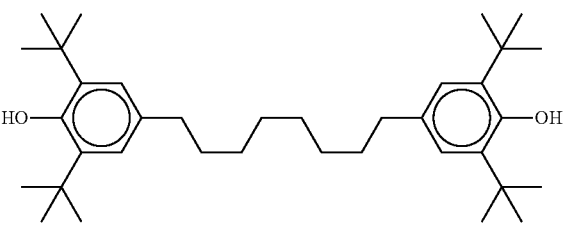

(H-15)
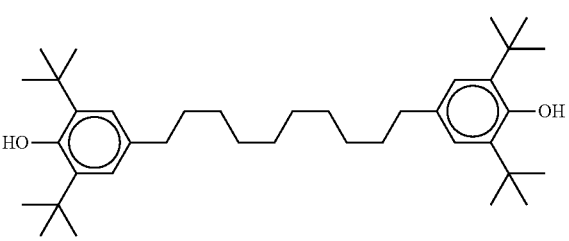

In the case where an antioxidant is contained in the liquid crystal composition containing a polymerizable compound according to the present invention, 10 mass ppm or more is preferable, 20 mass ppm or more is preferable, and 50 mass ppm or more is preferable. In the case where the antioxidant is contained, the upper limit is 10,000 mass ppm, preferably 1,000 mass ppm, preferably 500 mass ppm, and preferably 100 mass ppm.

In the liquid crystal composition containing a polymerizable compound according to the present invention, the total content of the first component, the second component, the third component, and compounds selected from a compound group represented by general formula (IV-A) to general formula (IV-J) is preferably 70 to 100 percent by mass, further preferably 80 to 100 percent by mass, and particularly preferably 85 to 100 percent by mass.

The dielectric anisotropy (Δε) at 25° C. of the liquid crystal composition containing a polymerizable compound according to the present invention is −2.0 to −8.0, preferably −2.0 to −6.0, more preferably −2.0 to −5.0, and particularly preferably −2.5 to −5.0.

The refractive index anisotropy (Δn) at 20° C. of the liquid crystal composition containing a polymerizable compound according to the present invention is 0.08 to 0.14, more preferably 0.09 to 0.13, and particularly preferably 0.09 to 0.12. For further details, in the case where a narrow cell gap is employed, 0.10 to 0.13 is preferable. In the case where a wide cell gap is employed, 0.08 to 0.10 is preferable.

The viscosity (η) at 20° C. of the liquid crystal composition containing a polymerizable compound according to the present invention is 10 to 30 mPa·s, more preferably 10 to 25 mPa·s, and particularly preferably 10 to 22 mPa·s.

The rotational viscosity (γ1) at 20° C. of the liquid crystal composition containing a polymerizable compound according to the present invention is 60 to 130 mPa·s, more preferably 60 to 110 mPa·s, and particularly preferably 60 to 100 mPa·s.

The nematic phase-isotropic liquid phase transition temperature ($T_{ni}$) of the liquid crystal composition containing a polymerizable compound according to the present invention is 60° C. to 120° C., more preferably 70° C. to 100° C., and particularly preferably 70° C. to 85° C.

The liquid crystal display element using the liquid crystal composition according to the present invention has a remarkable feature that rapid response is exhibited. In addition, a sufficient pretilt angle is obtained, the amount of remaining monomer is zero or small to such an extent that no problem occurs, the voltage holding rate (VHR) is high, and there are no problems, e.g., alignment defects and display defects, or the problems are sufficiently suppressed. Also, the pretilt angle and the amount of remaining monomer can be easily controlled and, thereby, optimization and reduction of the production energy cost are easily performed. Therefore, the liquid crystal display element according to the present invention is most suitable for improvement of the production efficiency and stable mass production.

The liquid crystal display element using the liquid crystal composition according to the present invention is particularly useful for an active-matrix-drive liquid crystal display element and can be applied to PSA mode, PSVA mode, VA mode, PS-IPS mode, or PS-FFS mode liquid crystal display elements.

Two substrates of a liquid crystal cell included in the liquid crystal display element can use glass or a flexible transparent material such as plastic, and one of them may be an opaque material such as silicon. A transparent substrate having a transparent electrode layer can be obtained by, for example, sputtering indium tin oxide (ITO) on an transparent substrate, e.g., a glass plate.

A color filter can be formed by, for example, a pigment dispersion method, a printing method, an electrodeposition method, a staining method, or the like. A method for forming a color filter by the pigment dispersion method will be described as an example. The transparent substrate is coated with a curable color composition for a color filter, patterning is performed, and curing is performed by heating or light irradiation. This step is performed for each of three colors of red, green, and blue and, thereby, a pixel portion for the color filter can be formed. In addition, a pixel electrode provided with active elements, e.g., TFTs, thin film diodes, and metal insulator metal resistivity elements, may be disposed on the substrate.

The above-described substrates are opposed to each other with the transparent electrode layer inside. In this case, the distance between the substrates may be adjusted by interposing a spacer therebetween. In this case, it is preferable that the thickness of the resulting light control layer be adjusted to 1 to 100 μm, and 1.5 to 10 μm is further preferable. In the case where a polarizing plate is used, it is preferable that a product of the refractive index Δn and a cell thickness d of a liquid crystal be adjusted such that the contrast is maximized. Meanwhile, in the case where two polarizing plates are included, the polarization axis of each polarizing plate can be adjusted such that the viewing angle and the contrast are adjusted to become good. In addition, a phase difference film for increasing the viewing angle can also be used. Examples of spacers include glass particles, plastic particles, alumina particles, and photoresist materials. Thereafter, the substrate is screen printed with a sealing agent, e.g., an epoxy-based thermosetting composition, such that a liquid crystal injection hole is provided, the substrates are bonded to each other, and heating is performed so as to thermally cure the sealing agent.

Regarding the method for interposing a liquid crystal composition between the two substrates, a common vacuum injection method or ODF method can be used.

A method for polymerizing the polymerizable compound in the liquid crystal composition containing a polymerizable compound, in which the liquid crystal composition according to the present invention contains the polymerizable compound, is preferably a method for performing polymerization by radiating active energy rays, e.g., ultraviolet rays and electron beams, alone, in combination, or sequentially because an appropriate polymerization rate is desirable so as to obtain good alignment performance of the liquid crystal. In the case where ultraviolet rays are used, a polarized light source may be used or an unpolarized light source may be used. Meanwhile, in the case where the polymerization is performed in the state in which the liquid crystal composition containing a polymerizable compound is interposed between two substrates, at least the substrate on the irradiation surface side has to be provided with appropriate transparency with respect to the active energy rays. Also, a method, in which only a specific portion is polymerized by using a mask during light irradiation, the alignment state of an unpolymerized portion is then changed by changing the conditions, e.g., an electric field, a magnetic field, and a temperature, and polymerization is further performed by radiating active energy rays, may be employed. In particular, in ultraviolet exposure, it is preferable that ultraviolet exposure be performed while an alternating current electric field is applied to the liquid crystal composition containing a polymerizable compound. Regarding the applied alternating current electric field, the frequency of an alternating current is preferably 10 Hz to 10 kHz, the frequency is more preferably 60 Hz to 10 kHz, and the voltage is selected depending on the predetermined pretilt angle of the liquid crystal display element. That is, the pretilt angle of the liquid crystal display element can be controlled by the applied voltage. It is preferable that the pretilt angle of a liquid crystal display element of MVA mode be controlled to 80 degrees to 89.9 degrees from the viewpoint of alignment stability and contrast.

The temperature during irradiation is preferably within the temperature range in which a liquid crystal state of the liquid crystal composition according to the present invention is maintained. Preferably, polymerization is performed at a temperature close to room temperature, that is, typically 15° C. to 35° C. A metal halide lamp, a high-pressure mercury lamp, an extra-high-pressure mercury lamp, and the like can be used as the lamp for generating ultraviolet rays. Also, regarding the wavelength of radiated ultraviolet rays, it is preferable that ultraviolet rays in a wavelength region out of the absorption wavelength region of the liquid crystal composition be radiated. As necessary, it is preferable that ultraviolet rays be used after being cut. The intensity of the radiated ultraviolet rays is preferably 0.1 mW/cm² to 100 W/cm² and further preferably 2 mW/cm² to 50 W/cm². The amount of energy of the radiated ultraviolet rays can be appropriately adjusted, and is preferably 10 mJ/cm² to 500 J/cm² and further preferably 100 mJ/cm² to 200 J/cm². At the time of radiation of ultraviolet rays, the intensity may be changed. The time of radiation of ultraviolet rays is appropriately selected depending on the intensity of the radiated ultraviolet rays, and is preferably 10 seconds to 3,600 seconds and further preferably 10 seconds to 600 seconds.

EXAMPLES

The present invention will be described below in detail with reference to the examples, although the present invention is not limited to these examples. In this regard, "%" in the compositions of the following examples and the comparative examples refers to "percent by mass". In the examples, the following abbreviations are used for expression of compounds.

(Side chain)
-n —$C_nH_{2n+1}$ straight chain alkyl group having a carbon number of n
n- $C_nH_{2n+1}$— straight chain alkyl group having a carbon number of n
-On —$OC_nH_{2n+1}$ straight chain alkoxyl group having a carbon number of n
nO— $C_nH_{2n+1}O$— straight chain alkoxyl group having a carbon number of n
—V —CH=CH₂
V— CH₂—CH—
—V1 —CH=CH—CH₃
1V— CH₃—CH=CH—
-2V —CH₂—CH₂—CH=CH₃
V2- CH₃=CH—CH₂—CH₂—
-2V1 —CH₂—CH₂—CH=CH—CH₃
1V2 CH₃—CH=CH—CH₂—CH₂
(Linking Group)
—CF2O- —CF₂—O—
—OCF2- —O—CF₂—
-1O— —CH₂—O—
—O1- —O—CH₂—
—COO— —COO—
(Ring Structure)

[Chem. 36]

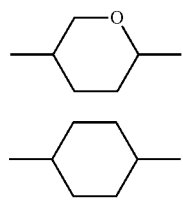 Py

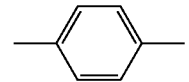 Cy

[Chem. 37]

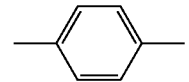 Ph

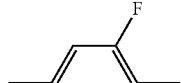 Ph1

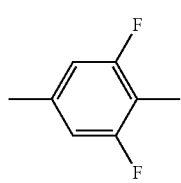 Ph2

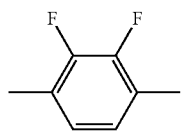 Ph5

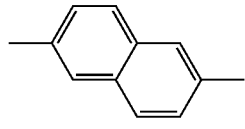 Np

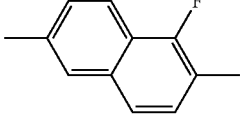 Np1

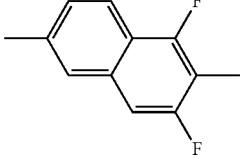 Np2

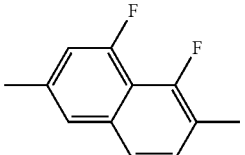 Np3

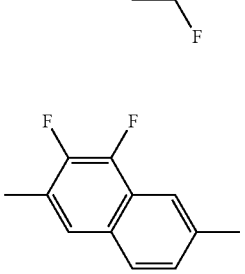 Np4

Np5

In the examples, measured characteristics are as described below.

$T_{ni}$: nematic phase-isotropic liquid phase transition temperature (° C.)

Δn: refractive index anisotropy at 20° C.

Δε: dielectric anisotropy at 25° C.

η: viscosity (mPa·s) at 20° C.

$γ_1$: rotational viscosity (mPa·s) at 20° C.

$K_{33}$: elastic modulus $K_{33}$ (pN) at 20° C.

VHR(UV): voltage holding rate after radiation of 12 (J) of UV with high-pressure mercury lamp Comparative Example 1, Comparative Example 2, Example 1, and Example 2

A liquid crystal composition LC-100 was prepared. Compounds selected from polymerizable compounds RM-21-02, RM-21-08, XX-4, and M302 were added to the resulting LC-100 so as to prepare liquid crystal compositions LC-A (Comparative example 1), LC-B (Comparative example 2), LC-1 (Example 1), and LC-2 (Example 2) and the physical property values thereof were measured. The configurations of the liquid crystal compositions and results of the physical property values thereof are as shown in Table 1.

TABLE 1

| | | LC-100 | Comparative example 1 LC-A | Comparative example 2 LC-B | Example 1 LC-1 | Example 2 LC-2 |
|---|---|---|---|---|---|---|
| RM-21-02 | general formula (I-1), first component | — | — | — | 0.2 | 0.07 |
| RM-21-08 | general formula (I-1), first component | — | — | — | 0.2 | — |
| XX-4 | general formula (I-32) | — | 0.4 | — | — | — |
| M302 | general formula (I-31) | — | — | 0.4 | — | 0.53 |
| LC-100 | liquid crystal composition | — | 99.6 | 99.6 | 99.6 | 99.4 |
| 3-Cy-Cy-V | general formula (II), second component | 20 | — | — | — | — |
| 2-Cy-Cy-V1 | general formula (II), second component | 5 | — | — | — | — |
| 3-Cy-Cy-V1 | general formula (II), second component | 14 | — | — | — | — |
| 3-Cy-1O—Ph5—O2 | general formula (III-1), third component | 7 | — | — | — | — |
| 1V-Cy-1O—Ph5—O1 | general formula (III-1), third component | 5 | — | — | — | — |
| 1V-Cy-1O—Ph5—O2 | general formula (III-1), third component | 5 | — | — | — | — |
| 3-Cy-Ph5—O2 | general formula (III-1), third component | — | — | — | — | — |
| 3-Ph—Ph5—O2 | general formula (III-1), third component | — | — | — | — | — |
| 2-Cy-Cy-1O—Ph5—O2 | general formula (III-2), third component | — | — | — | — | — |
| 3-Cy-Cy-1O—Ph5—O2 | general formula (III-2), third component | 13 | — | — | — | — |
| V-Cy-Cy-1O—Ph5—O2 | general formula (III-2), third component | — | — | — | — | — |
| 1V-Cy-Cy-1O—Ph5—O1 | general formula (III-2), third component | 7 | — | — | — | — |
| 1V-Cy-Cy-1O—Ph5—O2 | general formula (III-2), third component | 7 | — | — | — | — |
| 3-Cy-Cy-Ph5—O2 | general formula (III-2), third component | — | — | — | — | — |
| 3-Cy-Ph—Ph5—O2 | general formula (III-2), third component | — | — | — | — | — |
| 3-Cy-Ph—Ph5—O3 | general formula (III-2), third component | — | — | — | — | — |
| 3-Cy-Ph—Ph5—O4 | general formula (III-2), third component | — | — | — | — | — |
| 3-Cy-Cy-2 | general formula (IV-A) | — | — | — | — | — |
| 3-Ph—Ph-1 | general formula (IV-F) | 8 | — | — | — | — |
| 5-Ph—Ph-1 | general formula (IV-F) | — | — | — | — | — |
| 3-Cy-Cy-Ph-1 | general formula (IV-G) | — | — | — | — | — |
| V-Cy-Ph—Ph-3 | general formula (IV-H) | 9 | — | — | — | — |
| 3-Ph—Ph5—Ph-2 | general formula (V) | — | — | — | — | — |
| 1V2-Ph—Ph5—Ph—2V1 | general formula (V) | — | — | — | — | — |
| 3-Np—Ph5—Ph-2 | general formula (N-001) | — | — | — | — | — |
| Total | | 100 | 100 | 100 | 100 | 100 |
| Tni [° C.] | | 75 | 75 | 75 | 75 | 75 |
| Δn | | 0.097 | 0.097 | 0.097 | 0.097 | 0.097 |
| η [mPa · s] | | 13.3 | 13.3 | 13.3 | 13.3 | 13.3 |
| γ1 [mPa · s] | | 77 | 77 | 77 | 77 | 77 |
| Δε | | −3.0 | −3.0 | −3.0 | −3.0 | −3.0 |
| VHR(UV) | | 60 | 64 | 77 | 81 | 86 |

[Chem. 38]

RM-21-02

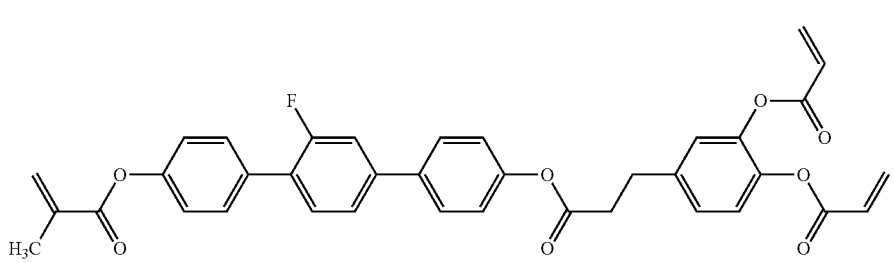

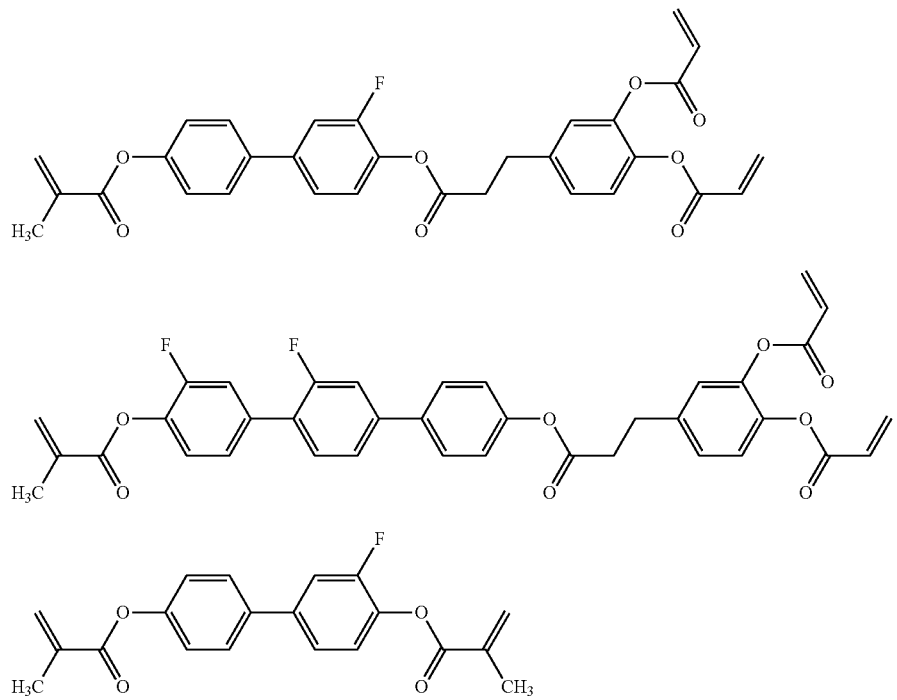

It was ascertained that the liquid crystal compositions LC-1 and LC-2 according to the present invention were liquid crystal compositions containing a polymerizable compound, in which physical property values of LC-100 were maintained, sufficient pretilt angles were obtained, there was no remaining monomer, and voltage holding rates (VHR) were high.

On the other hand, regarding LC-A of Comparative example 1, a pretilt angle was hardly obtained, the amount of remaining monomer was large, and the value of VHR (UV) was a low value of 64%. Regarding the result of LC-B of Comparative example 2, VHR(UV) was a slightly higher value of 77%. However, a pretilt angle was hardly obtained and the amount of remaining monomer was large. The response speeds of the liquid crystal display elements using them were measured. As a result, it was ascertained that rapid response was sufficiently exhibited. In this regard, the cell thickness was 3.5 um, an alignment layer was JALS2096, response speed measurement conditions were such that Von was 6 V, Voff was 1 V, and the measurement temperature was 25° C., and DMS703 produced by AUTRONIC-MELCHERS was used as the measurement apparatus.

Example 3, Example 4, and Example 5

A liquid crystal composition LC-200 was prepared. Compounds selected from polymerizable compounds RM-21-03, RM-21-06, XX-2, and M302 were added to the resulting LC-200 so as to prepare liquid crystal compositions LC-3 (Example 3), LC-4 (Example 4), and LC-5 (Example 5) and the physical property values thereof were measured. The configurations of the liquid crystal compositions and results of the physical property values thereof are as shown in Table 2.

TABLE 2

| | | LC-200 | Example 3 LC-3 | Example 4 LC-4 | Example 5 LC-5 |
|---|---|---|---|---|---|
| RM-21-03 | general formula (I-1), first component | — | 0.05 | — | 0.1 |
| RM-21-06 | general formula (I-1), first component | — | — | 0.1 | 0.1 |
| XX-2 | general formula (I-32) | — | — | — | 0.3 |
| M302 | general formula (I-31) | — | 0.35 | 0.5 | — |
| LC-200 | liquid crystal composition | — | 99.6 | 99.4 | 99.5 |
| 3-Cy-Cy-V | general formula (II), second component | 37 | — | — | — |
| 2-Cy-Cy-V1 | general formula (II), second component | — | — | — | — |
| 3-Cy-Cy-V1 | general formula (II), second component | — | — | — | — |
| 3-Cy-1O—Ph5—O2 | general formula (III-1), third component | 4 | — | — | — |
| 1V-Cy-1O—Ph5—O1 | general formula (III-1), third component | 4 | — | — | — |
| 1V-Cy-1O—Ph5—O2 | general formula (III-1), third component | 4 | — | — | — |
| 3-Cy-Ph5—O2 | general formula (III-1), third component | — | — | — | — |
| 3-Ph—Ph5—O2 | general formula (III-1), third component | 3 | — | — | — |
| 2-Cy-Cy-1O—Ph5—O2 | general formula (III-2), third component | 3 | — | — | — |
| 3-Cy-Cy-1O—Ph5—O2 | general formula (III-2), third component | 7 | — | — | — |
| V-Cy-Cy-1O—Ph5—O2 | general formula (III-2), third component | 3 | — | — | — |

TABLE 2-continued
|  |  | LC-200 | Example 3 LC-3 | Example 4 LC-4 | Example 5 LC-5 |
|---|---|---|---|---|---|
| 1V-Cy-Cy-1O—Ph5—O1 | general formula (III-2), third component | 7 | — | — | — |
| 1V-Cy-Cy-1O—Ph5—O2 | general formula (III-2), third component | 7 | — | — | — |
| 3-Cy-Cy-2 | general formula (IV-A) | — | — | — | — |
| 3-Ph—Ph-1 | general formula (IV-F) | 4 | — | — | — |
| 5-Ph—Ph-1 | general formula (IV-F) | 4 | — | — | — |
| 3-Cy-Ph—Ph-2 | general formula (IV-H) | 4 | — | — | — |
| V-Cy-Ph—Ph-3 | general formula (IV-H) | 9 | — | — | — |
| Total |  | 100 | 100 | 100 | 100 |
| Tni [° C.] |  | 74 | 74 | 74 | 74 |
| Δn |  | 0.100 | 0.098 | 0.098 | 0.098 |
| η [mPa · s] |  | 12.7 | 12.7 | 12.7 | 12.7 |
| γ1 [mPa · s] |  | 72 | 72 | 72 | 72 |
| Δε |  | −2.8 | −2.8 | −2.8 | −2.8 |
| VHR(UV) |  | 53 | 78 | 82 | 77 |
[Chem. 39]
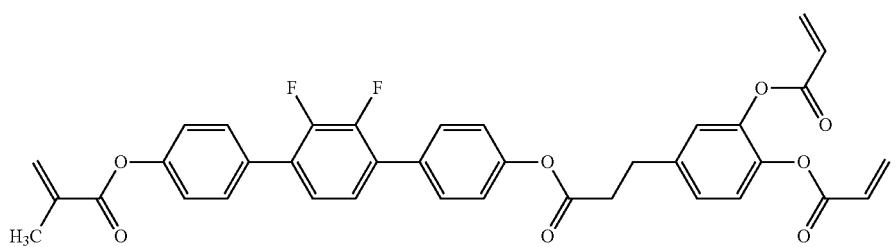
RM-21-03
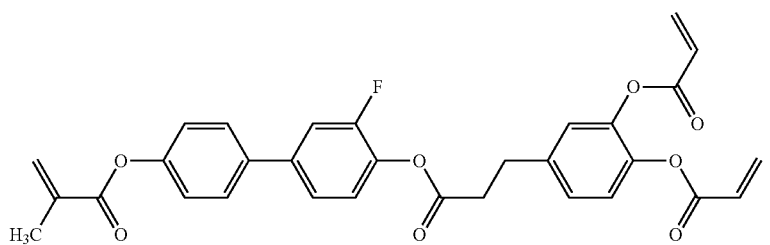
M302
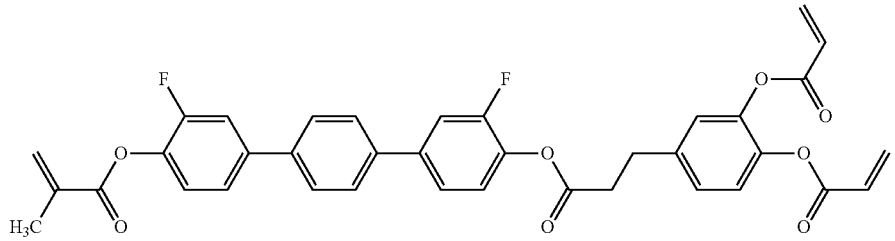
RM-21-06
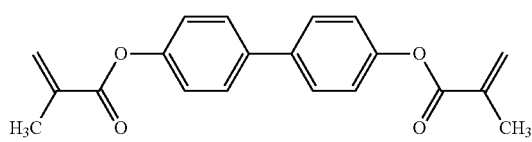
XX-2

It was ascertained that the liquid crystal compositions LC-3, LC-4, and LC-5 according to the present invention were liquid crystal compositions containing a polymerizable compound, in which sufficient pretilt angles were obtained, there was no remaining monomer, and voltage holding rates (VHR) were high.

The response speeds of the liquid crystal display elements using them were measured. As a result, it was ascertained that rapid response was sufficiently exhibited. In this regard, the cell thickness was 3.5 um, an alignment layer was JALS2096, response speed measurement conditions were such that Von was 6 V, Voff was 1 V, and the measurement temperature was 25° C., and DMS703 produced by AUTRONIC-MELCHERS was used as the measurement apparatus.

Example 6

A liquid crystal composition LC-300 was prepared. Polymerizable compounds RM-22-02 and M301 were added to the resulting LC-300 so as to prepare a liquid crystal composition LC-6 (Example 6) and the physical property values thereof were measured. The configuration of the liquid crystal composition and results of the physical property values thereof are as shown in Table 3.

TABLE 3

|  |  |  | Example 6 |
|---|---|---|---|
|  |  | LC-300 | LC-6 |
| RM-22-09 | general formula (I-1), first component | — | 0.1 |
| M301 | general formula (I-31) | — | 0.4 |
| LC-300 | liquid crystal composition | — | 99.5 |

TABLE 3-continued

|  |  | LC-300 | Example 6 LC-6 |
|---|---|---|---|
| 3-Cy-Cy-V | general formula (II), second component | 29 | — |
| 3-Cy-Cy-V1 | general formula (II), second component | 5 | — |
| 3-Cy-1O—Ph5—O2 | general formula (III-1), third component |  | — |
| 3-Cy-Ph5—O2 | general formula (III-1), third component | 7 | — |
| 3-Ph—Ph5—O2 | general formula (III-1), third component | 16 | — |
| 2-Cy-Ph—Ph5—O2 | general formula (III-2), third component | 6 | — |
| 3-Cy-Ph—Ph5—O3 | general formula (III-2), third component | 6 | — |
| 3-Cy-Ph—Ph5—O4 | general formula (III-2), third component | 8 | — |
| 3-Cy-Cy-Ph5—O2 | general formula (III-2), third component | 10 | — |
| 3-Cy-Cy-Ph5—O3 | general formula (III-2), third component | 8 | — |
| 3-Cy-Cy-2 | general formula (IV-A) | 3 | — |
| 3-Ph—Ph-1 | general formula (IV-F) | 2 | — |
| 5-Ph—Ph-1 | general formula (IV-F) |  | — |
| 3-Cy-Ph—Ph-2 | general formula (IV-H) |  | — |
| Total |  | 100 | 100 |
| Tni [° C.] |  | 81 | 81 |
| Δn |  | 0.105 | 0.105 |
| η [mPa·s] |  | 13.5 | 13.5 |
| γ1 [mPa·s] |  | 80 | 80 |
| Δε |  | −3.1 | −3.1 |
| VHR(UV) |  | 53 | 81 |

[Chem. 40]

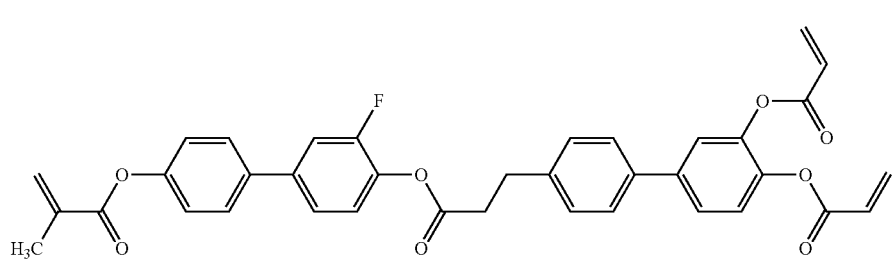

RM-22-09

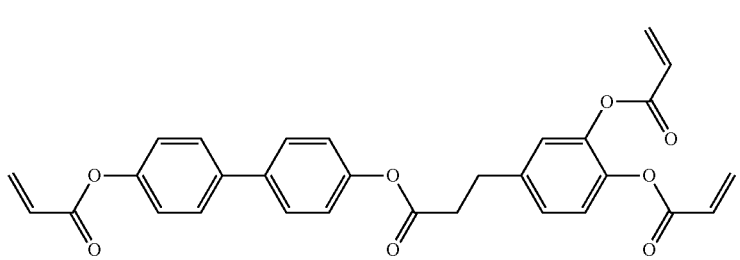

M301

It was ascertained that the liquid crystal composition LC-6 according to the present invention was a liquid crystal compositions containing a polymerizable compound, in which a sufficient pretilt angle was obtained, there was no remaining monomer, and a voltage holding rate (VHR) was high. The response speed of the liquid crystal display element using this was measured. As a result, it was ascertained that rapid response was sufficiently exhibited. In this regard, the cell thickness was 3.5 um, an alignment layer was JALS2096, response speed measurement conditions were such that Von was 6 V, Voff was 1 V, and the measurement temperature was 25° C., and DMS703 produced by AUTRONIC-MELCHERS was used as the measurement apparatus.

Consequently, it was ascertained that regarding the liquid crystal composition according to the present invention, the refractive index anisotropy ($\Delta n$) and the nematic phase-isotropic liquid phase transition temperature ($T_{ni}$) were not reduced, the viscosity ($\eta$) was sufficiently low, the rotational viscosity ($\gamma_1$) was sufficiently low, the elastic modulus ($K_{33}$) was large, and the negative dielectric anisotropy ($\Delta\varepsilon$) having a large absolute value was exhibited, and regarding the VA, PSVA, or PSA liquid crystal display element using the liquid crystal composition, a sufficient pretilt angle was obtained, the amount of remaining monomer was small or zero, the voltage holding rate (VHR) was high, excellent display quality was exhibited, and the response speed was high.

The invention claimed is:

1. A liquid crystal composition containing:
a polymerizable compound as a first component selected from the group consisting of compounds represented by a general formula (I-21) and a general formula (I-22),

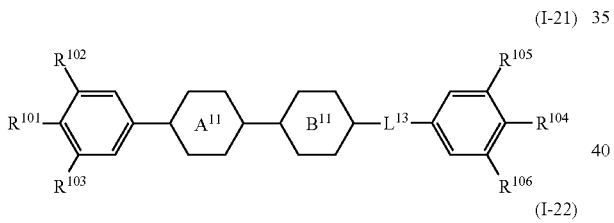

(I-21)

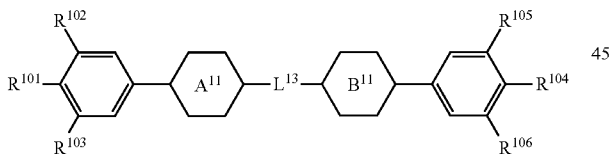

(I-22)

wherein in the formulae (I-21) and (I-22), each of $R^{101}$ to $R^{106}$ independently represents a hydrogen atom, an alkyl group having 1 to 12 carbon atoms, an alkoxyl group having 1 to 12 carbon atoms, $P^{11}$—$S^{11}$—, or $P^{12}$—$S^{12}$—, three or four of $R^{101}$ to $R^{106}$ represent $P^{11}$—$S^{11}$— or $P^{12}$—$S^{12}$—, at least one of included $S^{11}$ and $S^{12}$ is a single bond, each of $A^{11}$ and $B^{11}$ independently represents a 1,4-phenylene group, a 1,4-cyclohexylene group, a naphthalene-2,6-diyl group, or a 1,2,3,4-tetrahydronaphthalene-2,6-diyl group, in which the group may be unsubstituted or be substituted with an alkyl group having 1 to 3 carbon atoms, an alkoxyl group having 1 to 3 carbon atoms, or a halogen, and $L^{13}$ represents —OCH$_2$—, —CH$_2$O—, —C$_2$H$_4$—, —COO—, —OCO—, —CH=CR$^a$—COO—, —CH=CR$^a$—OCO—, —COO—CR$^a$=CH—, —OCO—CR$^a$=CH—, —(CH$_2$)$_z$—COO—, —(CH$_2$)$_z$—OCO—, —OCO—(CH$_2$)$_z$—, —COO—(CH$_2$)$_z$—, —CH=CH—, —CF$_2$O—, —OCF$_2$—, or —C≡C— wherein in the formulae, each R$^a$ independently represents a hydrogen atom or an alkyl group having 1 to 3 carbon atoms, and in the formulae, z represents an integer of 1 to 4;

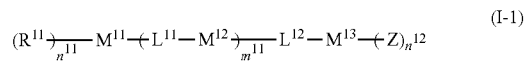

(I-1)

and
at least one liquid crystal compound having an alkenyl side chain group as a second component, wherein the liquid crystal compound having the alkenyl side chain group is a compound represented by a general formula (II),

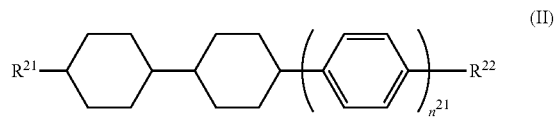

(II)

wherein in the formula (II), $R^{21}$ represents an alkenyl group having 2 to 10 carbon atoms, $R^{22}$ represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —CH$_2$— or each of a plurality of —CH$_2$— that do not adjoin, which is present in $R^{22}$, may be independently substituted with —O— and/or —S—, each of at least one hydrogen atom present in $R^{22}$ may be independently substituted with a fluorine atom or a chlorine atom, and $n^{21}$ represents 0 or 1.

2. The liquid crystal composition according to claim 1, comprising at least one compound selected from the compound group represented by a general formula (III-1) and a general formula (III-2) as a third component,

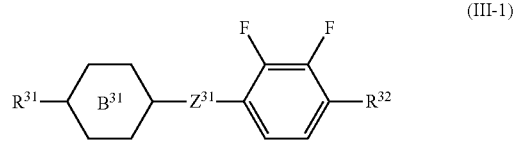

(III-1)

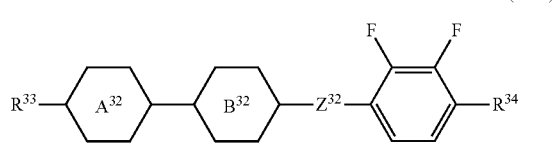

(III-2)

wherein in the formulae (III-1) and (III-2), each of $R^{31}$ to $R^{34}$ independently represents an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —CH$_2$— or each of a plurality of —CH$_2$— that do not adjoin, present in $R^{31}$ to $R^{34}$, may be independently substituted with —O— and/or —S—, each of at least one hydrogen atom present in $R^{31}$ to $R^{34}$ may be independently substituted with a fluorine atom or a chlorine atom, each of ring $A^{32}$, ring $B^{31}$, and ring $B^{32}$ represents a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, decahydronaphthalene-2,6-diyl group, or a 1,2,3,4-tetrahydronaphtalene-2,6-diyl group, and each of $Z^{31}$ and $Z^{32}$ independently represents —OCH$_2$—, —CH$_2$O—, —CF$_2$O—, —OCF$_2$—, —CH$_2$CH$_2$—, —CF$_2$CF$_2$—, or a single bond.

3. The liquid crystal composition according to claim 1, comprising at least one compound selected from the compound group represented by a general formula (IV-A) to a general formula (IV-J) as another component,

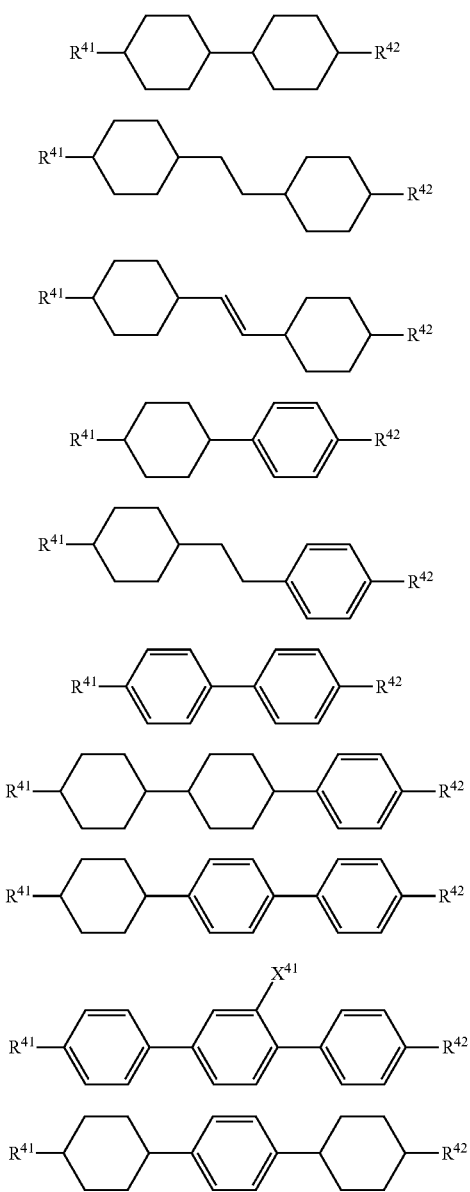

wherein in the formulae (IV-A) to (IV-J), each of $R^{41}$ and $R^{42}$ independently represents an alkyl group having 1 to 5 carbon atoms or an alkoxy group having 1 to 5 carbon atoms, $X^{41}$ represents an alkyl group having 1 to 3 carbon atoms, alkoxy group having 1 to 3 carbon atoms, a fluorine atom, or a hydrogen atom.

4. The liquid crystal composition according to claim 1, further comprising at least one compound selected from the compound group represented by a general formula (I-31) and a general formula (I-32),

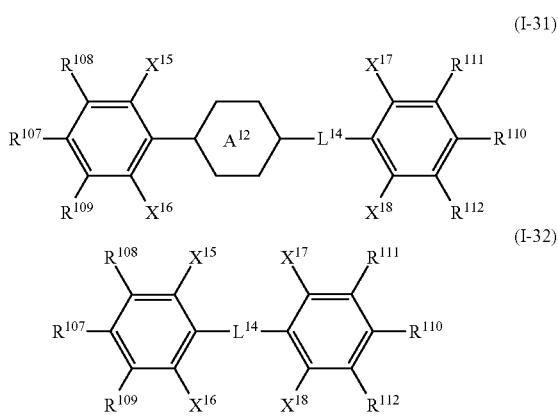

wherein in the formulae (I-31) and (I-32), $R^{107}$ represents $P^{107}$—$S^{107}$—, $R^{110}$ represents $P^{110}$—$S^{110}$—, each of $P^{107}$ and $P^{110}$ independently represents any one of formula (R-1) to formula (R-15), each of $S^{107}$ and $S^{107}$ independently represents a single bond or an alkylene group having 1 to 15 carbon atoms, at least one —CH$_2$— in the alkylene group may be substituted with —O—, —OCO—, or —COO— such that oxygen atoms do not directly adjoin, each of $R^{108}$, $R^{109}$, $R^{111}$, and $R^{112}$ independently represents any one of formula (R-1) to formula (R-15), an alkyl group having 1 to 3 carbon atoms, an alkoxy group having 1 to 3 carbon atoms, a fluorine atom, or a hydrogen atom, $A^{12}$ represents a 1,4-phenylene group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, in which the group may be unsubstituted or may be substituted with an alkyl group having 1 to 12 carbon atoms, an alkoxyl group having 1 to 12 carbon atoms, a halogen, a cyano group, or a nitro group, and $L^{14}$ represents a single bond, —OCH$_2$—, —CH$_2$O—, —C$_2$H$_4$—, —COO—, —OCO—, —CH=CR$^a$—COO—, —CH=CR$^a$—OCO—, —COO—CR$^a$=CH—, —OCO—CR$^a$=CH—, —(CH$_2$)$_z$—COO—, —(CH$_2$)$_z$—OCO—, —OCO—(CH$_2$)$_z$—, —COO—(CH$_2$)$_z$—, —CH=CH—, —CF$_2$O—, —OCF$_2$—, or —C≡C— wherein each R$^a$ independently represents a hydrogen atom or an alkyl group having 1 to 3 carbon atoms, and z represents an integer of 1 to 4.

5. A liquid crystal display element comprising the liquid crystal composition according to claim 1.

6. An active-matrix-drive liquid crystal display element comprising the liquid crystal composition according to claim 1.

7. A liquid crystal display element of PSA mode, PSVA mode, PS-IPS mode, or PS-FSS mode, comprising the liquid crystal composition according to claim 1.

8. The liquid crystal composition according to claim 1, wherein a liquid crystal display element comprising the liquid crystal composition has a voltage holding rate of 77-86, the voltage holding rate being after radiation of 12 (J) of UV with high-pressure mercury lamp.

9. The liquid crystal composition according to claim 1, wherein said at least one of $L^{11}$ and $L^{12}$ represents —$(CH_2)_z$—C(=O)—O—, —$(CH_2)_z$—O—(C=O)—, —O—(C=O)—$(CH_2)_z$—, —(C=O)—O—$(CH_2)_z$—.

* * * * *